US010769588B1

(12) United States Patent
Kim et al.

(10) Patent No.: US 10,769,588 B1
(45) Date of Patent: Sep. 8, 2020

(54) SYSTEMS AND METHODS FOR GENERATING GRAPHICAL USER INTERFACES FOR ADAPTIVE DELIVERY SCHEDULING

(71) Applicant: Coupang Corp., Seoul (KR)

(72) Inventors: Yoo Suk Kim, Seoul (KR); Hyun Sik Eugene Minh, Seoul (KR)

(73) Assignee: COUPANG, CORP., Seoul (KR)

( * ) Notice: Subject to any disclaimer, the term of this patent is extended or adjusted under 35 U.S.C. 154(b) by 0 days.

(21) Appl. No.: 16/666,373

(22) Filed: Oct. 28, 2019

(51) Int. Cl.
*G06Q 10/08* (2012.01)
*G06Q 30/02* (2012.01)
*H04N 21/81* (2011.01)
*H04N 21/462* (2011.01)
*H04N 21/442* (2011.01)
*G06F 16/9535* (2019.01)
*H04N 21/45* (2011.01)

(52) U.S. Cl.
CPC ....... *G06Q 10/087* (2013.01); *G06F 16/9535* (2019.01); *G06Q 30/02* (2013.01); *H04N 21/44222* (2013.01); *H04N 21/4532* (2013.01); *H04N 21/4622* (2013.01); *H04N 21/812* (2013.01)

(58) Field of Classification Search
CPC ............. G06Q 10/083; G06Q 10/0832; G06Q 10/0833; G06Q 10/0835; G06Q 10/0837; G06Q 10/087; G06Q 10/082; G06Q 30/02; H06Q 30/02
USPC ........................................................ 705/330
See application file for complete search history.

(56) References Cited

U.S. PATENT DOCUMENTS

| 2005/0288993 | A1* | 12/2005 | Weng | ...................... | G06Q 10/06 705/7.31 |
| 2011/0258134 | A1* | 10/2011 | Mendez | ................ | G06Q 10/06 705/332 |
| 2015/0294260 | A1* | 10/2015 | Napoli | ................ | G06Q 10/087 705/337 |
| 2016/0224935 | A1* | 8/2016 | Burnett | .............. | G06Q 10/0834 |
| 2016/0342932 | A1* | 11/2016 | Imaeda | ................ | G06Q 10/083 |
| 2016/0350711 | A1* | 12/2016 | Tsao | ................... | G06Q 10/0833 |

(Continued)

OTHER PUBLICATIONS

Gademann et. al., "An order batching algorithm for wave picking in a parallel-aisle warehouse", IIE Transactions, 33, 385-598, 2001 (Year: 2001).*

(Continued)

*Primary Examiner* — Kevin H Flynn
*Assistant Examiner* — Emmett K. Walsh
(74) *Attorney, Agent, or Firm* — Finnegan, Henderson, Farabow, Garrett & Dunner LLP

(57) ABSTRACT

A computerized system for delivery scheduling. The system may include a processor and a non transitory storage medium comprising instructions. When executed by the at least one processor, the instructions may cause the at least one processor to perform steps. The steps may include receiving (from a remote system) an electronic request to order a product, determining information associated with the remote system and a fulfillment center associated with the information and the product, generating an electronic message, and forwarding (to the fulfillment center) the electronic message and instructions to generate a graphical user interface displaying request with the product and the delivery wave estimate.

20 Claims, 23 Drawing Sheets

(56) References Cited

U.S. PATENT DOCUMENTS

2018/0308051 A1\* 10/2018 Nemati ............ G06Q 10/08345
2018/0314999 A1\* 11/2018 Nemati ............ G06Q 10/06315
2019/0149952 A1\* 5/2019 Parks, Jr. ............... G06Q 20/12
705/26.82

OTHER PUBLICATIONS

Fardin Ahmadizar and Soma Farhadi, "Single-machine batch delivery scheduling with job release dates, due windows and earliness, tardiness, holding and delivery costs", Computers & Operations Research, 53, 194-205, 2015 (Year: 2015).\*

\* cited by examiner

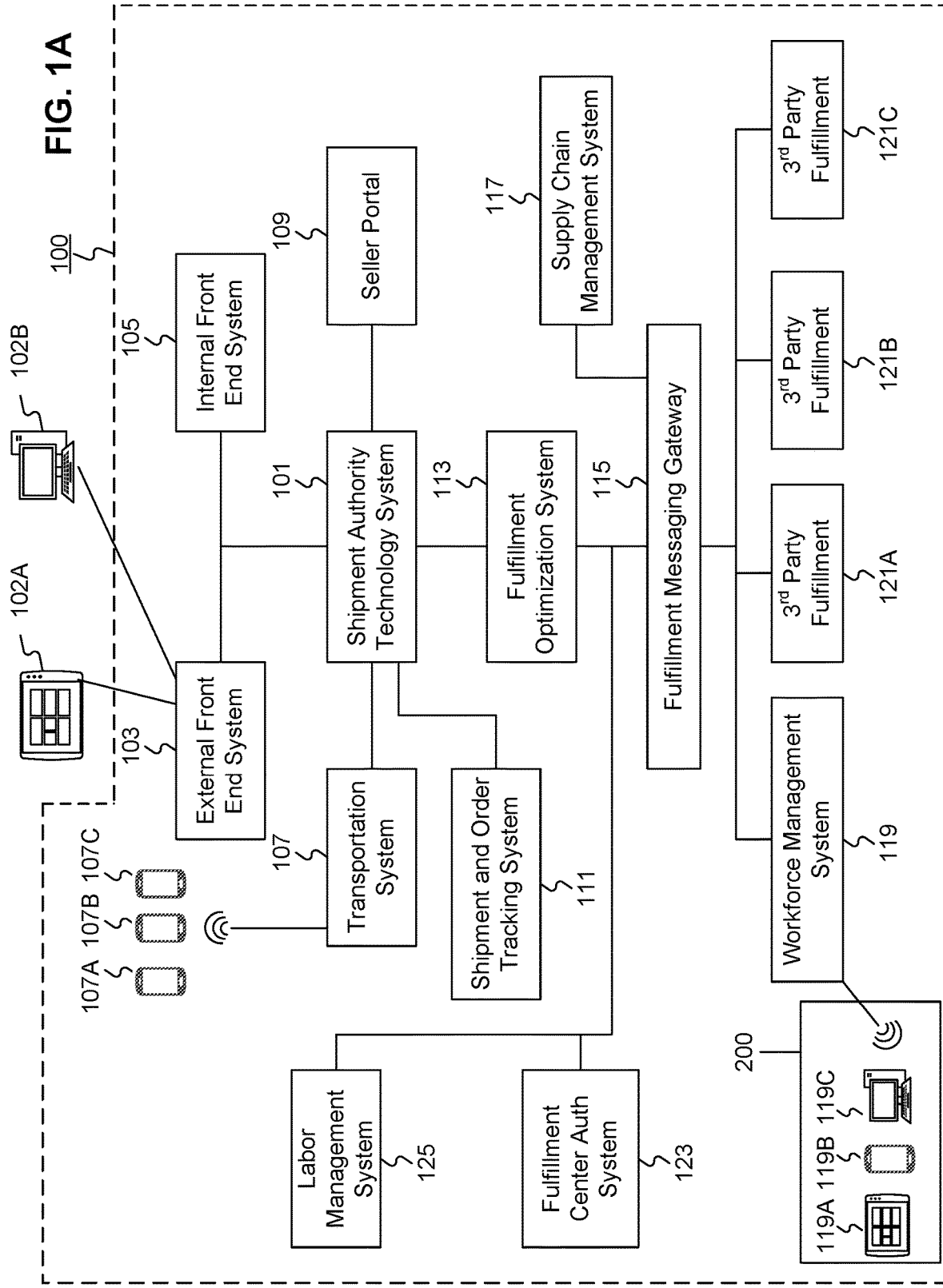

FIG. 1C

| Shipment | Add Shipment | | | | | |
|---|---|---|---|---|---|---|
| All (389) Mine (47) Published (383) Drafts (6) | | | | | | Search Shipment |
| Bulk Actions ▼ Apply -- Delivery Process -- ▼ Add dates -- All Shipper -- ▼ -- All Receiver -- ▼ Filter | | | | | | << < 1 of 5 > >> |
| ☐ Tracking Number | Worker Assigned ID | Customer ID | Date | Delivery Process | Actions | |
| ☐ 335XZ55 | N/A | N/A | February 24, 2020 | Wave 1 | 🚚 | 1002(a) |
| ☐ 1234aaa | muhammed muhammed | wpcargo_client filynz | April 8, 2020 | Wave 2 | 🚚 | 1002(b) |
| ☐ 6231000044 | A JINOMOTO | A JINOMOTO | April 19, 2020 | Shift 1 | 🚚 | 1002(c) |
| ☐ 335XZ55 | N/A | N/A | February 21, 2020 | Wave 1 | 🚚 | ... |
| ☐ 1Y4aaa | muhammed muhammed | wpcargo_client filynz | October 8, 2020 | Wave 2 | 🚚 | |
| ☐ 62E100 | A. Sun | A JINOMOTO | May 19, 2020 | Shift 1 | 🚚 | 1002(n) |
| 1004 | 1006 | 1008 | 1010 | 1012 | 1014 | |

NEW GROUP CREATION FORM

NEW GROUP NAME

☑

From 9:00 ▼    11:00 ▼

NOTES

SUBMIT

FIG. 12H

SYSTEMS AND METHODS FOR GENERATING GRAPHICAL USER INTERFACES FOR ADAPTIVE DELIVERY SCHEDULING

TECHNICAL FIELD

The present disclosure generally relates to computerized systems and methods for computerized delivery scheduling. In particular, embodiments of the present disclosure relate to inventive and unconventional systems for adaptive delivery scheduling that categorize deliveries, adapt delivery groups, and transmit instructions to client devices via graphical user interfaces.

BACKGROUND

Fulfillment of online orders involves an intricate network of electronic systems. Particularly nowadays that customers require next-day deliveries, automated returns, and minimal shipping costs, fulfillment of online orders require using a complex network of electronic systems that support order preparation and delivery. Multiple electronic systems in a network need to communicate with each other in real time to determine fulfillment processes, including for example shipping routes and/or distribution centers.

Standard electronic systems that manage distribution operations are not being able to handle the increasing volume and particularity demands. Standard systems do not adapt well with new requirements of expanded item-level handling, processing of smaller orders, and greater frequency of orders. For example, current electronic systems normally operate by batching orders that are going to a location. A retailer's electronic system may collect orders for a time period, group them, and then provide batched instructions to a shipping electronic system. These batching operations, however, may not achieve the expedited delivery times required for certain orders.

Moreover, because multiple parties are normally involved in fulfilling an online order, the current network of electronic systems electronic systems may have multiple elements that need to communicate frequently and in real-time. Electronic systems of online retailers frequently communicate in real-time with multiple distribution and fulfillment systems and may employ several hubs or camp zones to be able to quickly fulfill orders. This complexity of the electronic system network, however, is not easily scalable and prevents adjustments required for new customer demands. For example, current electronic systems are not well-suited to handle large numbers of orders that have distinct customer privileges because they are unable to efficiently assign delivery channels from premium users, rushed deliveries, or lowest-cost deliveries. Further, current systems are rigid and are not easily adaptable to face dynamic demand changes or customer requirements. Standard electronic systems are rigid and have established operations that are difficult to adapt throughout the delivery process. These electronic systems cannot easily adapt to new delivery chains that include, for example, temporary or on-demand workers and contractors. Thus, they do not efficiently handle the delivery requests or adapt delivery processes to meet customer demands.

Furthermore, current electronic systems for managing deliveries have outdated communication platforms that that fail to provide dynamic instructions required for adaptable systems. Current electronic systems rely on outdated technology that force users to use multiple platforms throughout the distribution chain.

Therefore, there is a need for improved methods and systems for adaptive delivery scheduling systems. The disclosed systems and methods for generating graphical user interfaces for adaptive delivery scheduling address one or more of the problems set forth above and/or other problems in the prior art.

SUMMARY

One aspect of the present disclosure is directed to a computerized system for delivery scheduling. The system may include at least one processor and at least one non transitory storage medium comprising instructions that, when executed by the at least one processor, cause the at least one processor to perform steps. The steps may include receiving (from a remote system) an electronic request to order a product, and determining information associated with the remote system determining a fulfillment center associated with the information and the product. The steps may also include generating (based on the information associated with the remote system) an electronic message including the determined fulfillment center, the product, a time of day, and a delivery wave estimate. The steps may also include forwarding (to the fulfillment center) the electronic message and instructions to generate a graphical user interface displaying the product and the delivery wave estimate.

Another aspect of the present disclosure is directed a non-transitory computer-readable medium, storing instructions that, when executed by a processor, perform operations for delivery scheduling. The operations may include receiving (from a remote system) an electronic request to order a product, and determining information associated with the remote system determining a fulfillment center associated with the information and the product. The operations may also include generating (based on the information associated with the remote system) an electronic message including the determined fulfillment center, the product, a time of day, and a delivery wave estimate. The operations may also include forwarding (to the fulfillment center) the electronic message and instructions to generate a graphical user interface displaying the product and the delivery wave estimate.

Yet another aspect of the present disclosure is directed to a computer-implemented method for delivery scheduling. The method may include operations of receiving (from a remote system) an electronic request to order a first product and a second product, determining information associated with the remote system, determining a first fulfillment center associated with the information and the first product and a second fulfillment center associated with the second product and the second fulfillment center. The operations may also include generating a first delivery wave for the first product and a second delivery wave for the second product; generating (based on the information associated with the remote system) an electronic message comprising the first and second fulfillment centers, the first and second products, a time of day, and the first and second delivery wave estimates. Further, the operations may include determining that the second delivery wave estimate is different from the first delivery wave; modifying at least one of the first or second delivery wave estimates to match the other delivery wave estimate. The operations may also include forwarding, to the fulfillment center, the electronic message and instructions to generate a graphical user interface displaying a list with the first and second products color-coded with corresponding delivery wave estimate; and sending an instruction to the fulfillment center to print shipping labels listing the first or second delivery wave estimates.

Other systems, methods, and computer-readable media are also discussed herein.

BRIEF DESCRIPTION OF THE DRAWINGS

Figure 1C:
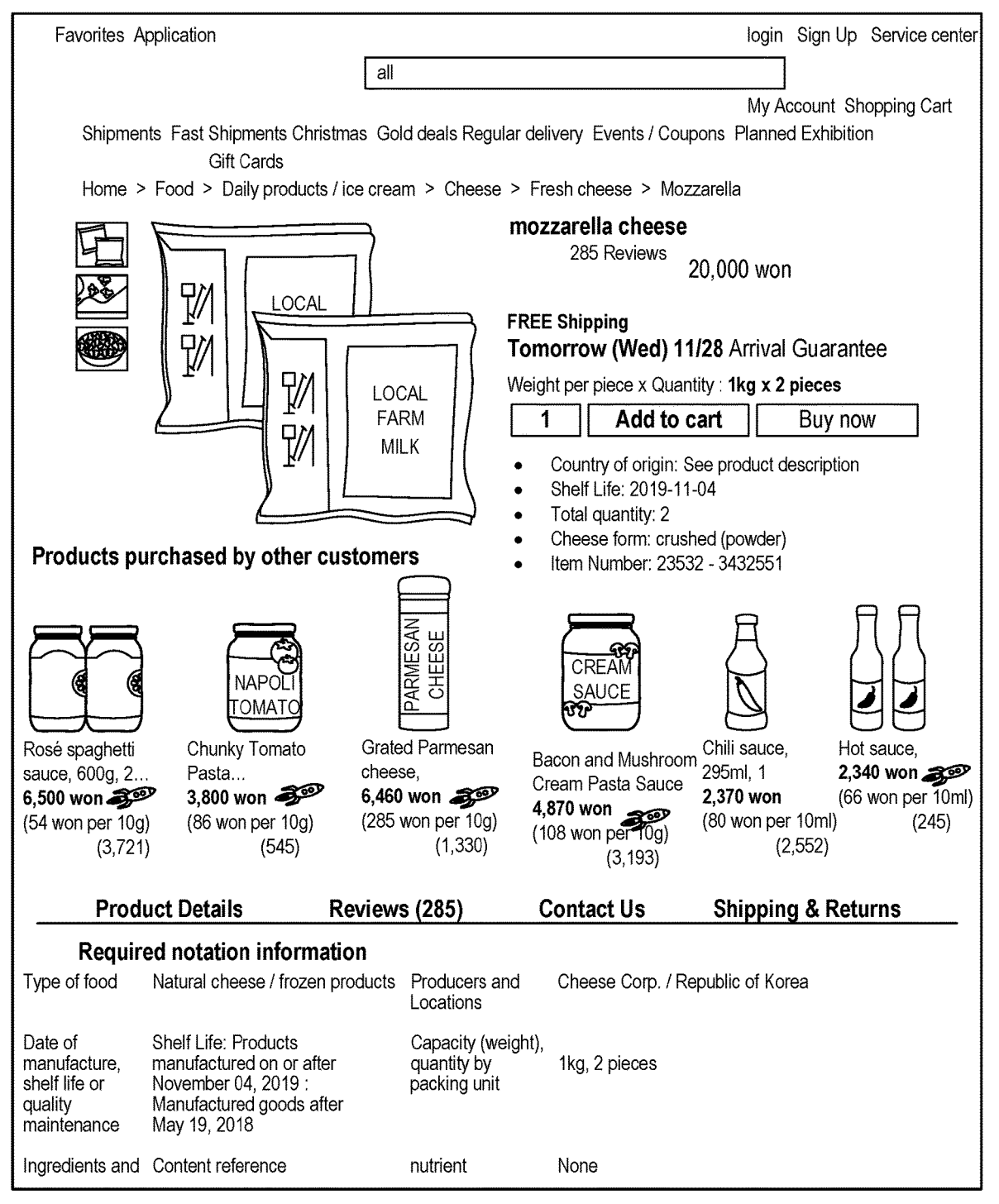

FIG. 1A is a schematic block diagram illustrating an exemplary embodiment of a network comprising computerized systems for communications enabling shipping, transportation, and logistics operations, consistent with the disclosed embodiments.

FIG. 1C depicts a sample Single Display Page (SDP) that includes a product and information about the product along with interactive user interface elements, consistent with the disclosed embodiments.

FIG. 10 is a front view of an exemplary graphical user interface in an administrator device, consistent with disclosed embodiments.

FIG. 12H is a front view of an eighth exemplary graphical user interface in a mobile device, consistent with disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for generating graphical user interfaces for adaptive delivery scheduling. The disclosed systems and methods enable automated and optimized order handling by, for example, determining fulfilment centers that are in best position to meet order requirements. The disclosed systems and methods also provide users of the system with graphical user interfaces and interactive tools to efficiently manage curriers and prioritize work. For example, the disclosed systems and methods improve the technical field of automated categorization of deliveries by providing supply chain managers greater visibility into forecasted orders to evaluate demand. In such embodiments, the disclosed systems and methods may employ machine-learning techniques to identify trends and predict fulfilment center of camp demand to make assignments.

Further, the disclosed systems and methods improve scheduling systems by enabling automatically adapting delivery processes. Disclosed delivery systems may operate in different delivery processes or paradigms. For example, the system may operate using a "waves process," a "shift process," or a combination. The waves process may arrange deliveries in waves of deliveries at different times. For example, wave deliveries may include a first wave of packages around a specific area (e.g., a route comprising sub-routes) several times a day. In contrast, a shift process may arrange deliveries to different areas, delivering first to a portion of a specific area (typically 50%), followed by a later delivery to the remaining portion of the specific area. The disclosed systems and methods may be configurable to reconfigure routes and worker schedules based on optimization parameters for the delivery process. For example, the disclosed systems and methods may analyze previous orders and performance of fulfilment centers or camps, to determine forecasted demand of each camp or fulfillment center. Then, the disclosed systems may use machine-learning predictive models to evaluate which delivery process has the most effective outcome and update all elements of the system accordingly. For example, if the system determines that delivering a group of orders is more efficient using a two-shift process, the disclosed systems and methods may update fulfilment centers, shipping authorities, and workers, to operate under the two-shift process. In such embodiments predictive analytics to configure the delivery process improves the systems for delivery scheduling with a particular computerized method to identify optimized delivery schedules.

Moreover, the disclosed systems and methods improve the flexibility of the delivery process by enabling dynamic changes of delivery processes. For example, if throughout one shift the system identifies that more temporary workers are available than expected, the system may re-run forecast models to update the delivery process and reconfigure the system, as needed. The disclosed systems also provide graphical user interfaces to provide feedback, modify groups, or change delivery processes.

The disclosed systems and methods may also improve the field of automated delivery scheduling by transforming order information into a sequence of instructions for delivery. For example, the disclosed systems and methods may process order requests automatically until generating a printed label with information for delivery. The label may include information of required delivery times, destinations, and priority information.

Furthermore, the disclosed systems and methods solves technical issues of poor display of information in mobile devices because the disclosed systems may generate user interfaces that effectively manage screen space. Particularly for portable devices used by couriers, in which the screen space is limited, the disclosed systems and methods may generate dynamic GUIs that specifically display elements that are relevant for the courier while removing irrelevant elements. For example, the disclosed methods may include dynamically modifying GUIs based on adaptable delivery modes, showing couriers notifications, changes, groups of deliveries or required prioritization. The disclosed systems and methods also include GUI configurations that may facilitate establishing delivery routes, creating groups, or updating the system.

Reference will now be made in detail to the disclosed embodiments, examples of which are illustrated in the accompanying drawings.

FIG. 1A shows a schematic block diagram of system 100 illustrating an exemplary embodiment of a system comprising computerized systems for communications enabling shipping, transportation, and logistics operations. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
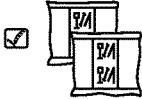
FIG. 1D depicts a sample cart page that includes items in a virtual shopping cart along with interactive user interface elements, consistent with the disclosed embodiments.
Figure 1E:
FIG. 1E depicts a sample order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an order page (e.g., FIG. 1E) in response to receiving the request to initiate a purchase. The order page, in some embodiments, re-lists the items from the shopping cart and requests input of payment and shipping information. For example, the order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where SAT system 101 enables the presentation of systems to enable users to place an order for an item, internal front end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may comprise one or more of these systems, while in another aspect, internal front-end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more users (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
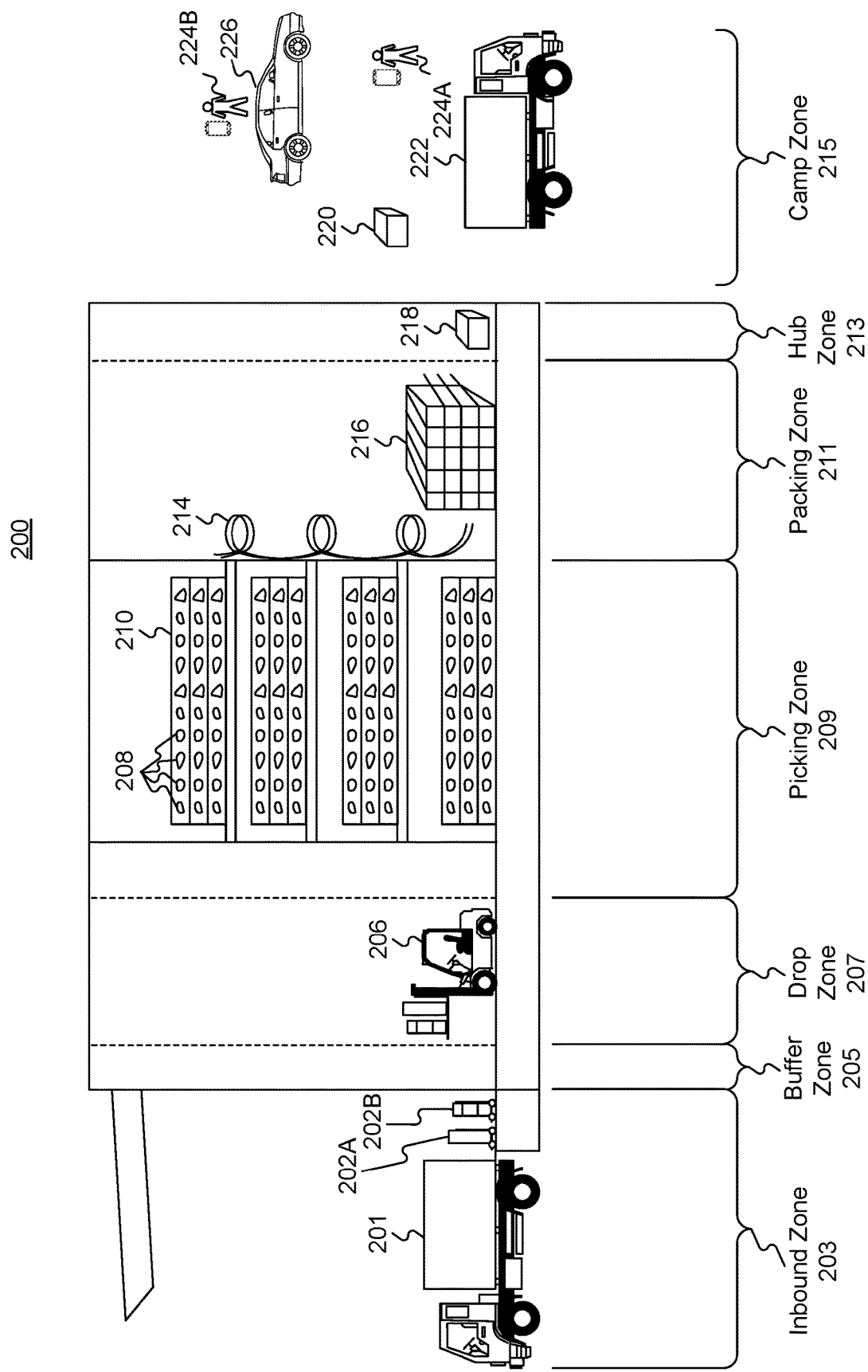
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
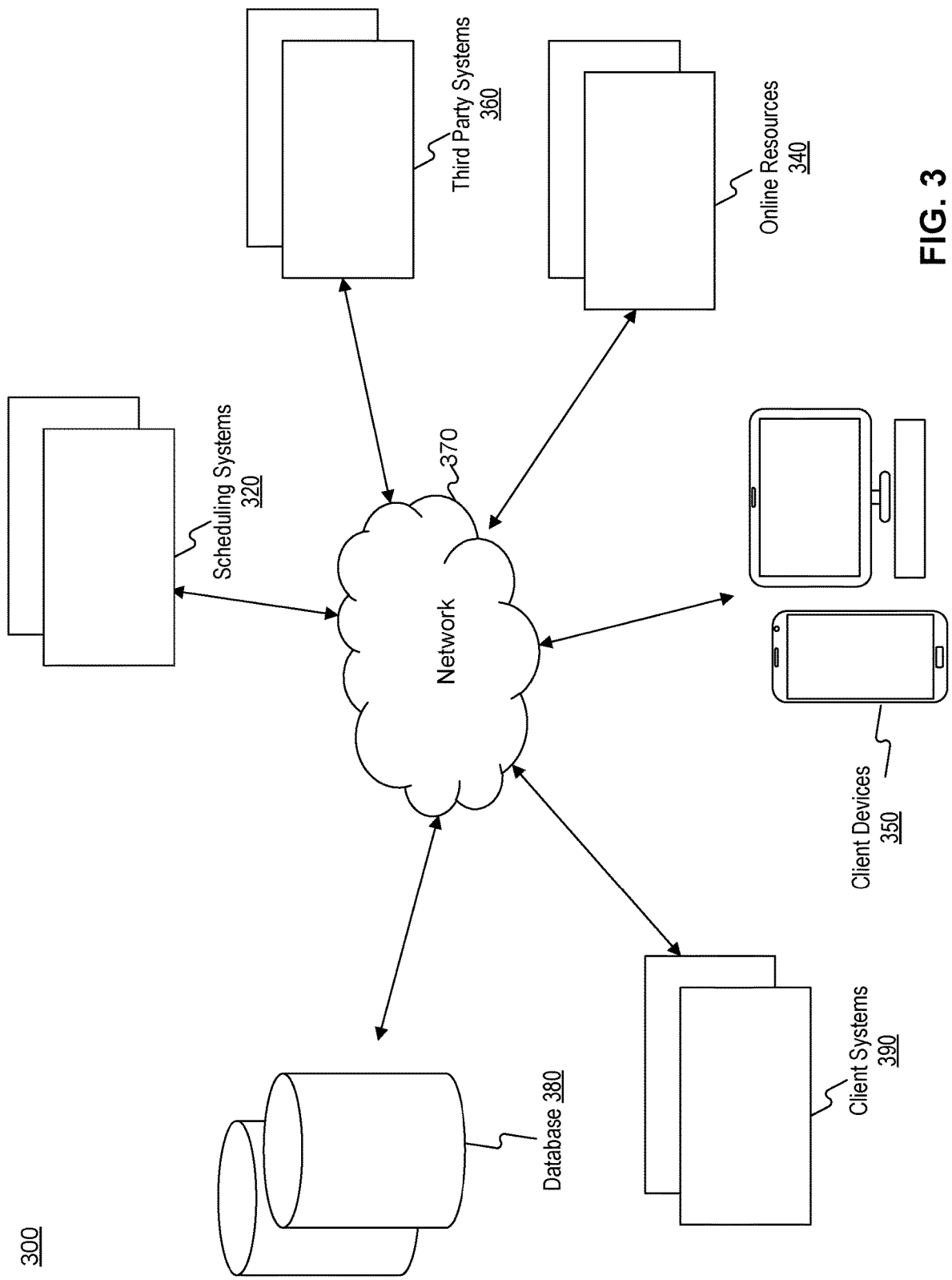
FIG. 3 is a schematic block diagram of an exemplary system, consistent with disclosed embodiments.

FIG. 3 is a block diagram of an exemplary system 300, consistent with disclosed embodiments. In system 300, a scheduling system (e.g., 320) may process data streams in real-time to, for example, allocate deliveries, generate delivery routes, and communicate with workers. System 300 may include one or more scheduling systems 320, online resources 340, client devices 350, third party systems 360, client systems 390, and database 380. In some embodiments, as shown in FIG. 3, components of system 300 may be connected to a network 370. However, in other embodiments components of system 300 may be connected directly with each other, without network 370. For example, database 380 may be directly coupled to scheduling system 320.

In some embodiments, scheduling system 320 may be implemented with one or more of the components of system 100 (FIG. 1A). For example, scheduling system 320 may include front-end system 105, FO system 113, SCM system 117, and WMS 119 (FIG. 1A). In other embodiments, scheduling system 320 may be implemented with one or more independent servers configured to perform operations for delivery scheduling.

Online resources 340 may include one or more servers or storage services provided by an entity such as a provider of website hosting, networking, cloud, or backup services. In some embodiments, online resources 340 may be associated with hosting services or servers that store web pages for authentication services, Domain Name System (DNS), or landing pages. In other embodiments, online resources 340 may be associated with a cloud computing service. In yet other embodiments, online resources 340 may be associated with a messaging service, such as, for example, Apple Push Notification Service, Azure Mobile Services, or Google Cloud Messaging. In such embodiments, online resources 340 may handle the delivery of messages and notifications related to functions of the disclosed embodiments, such as handling digital rights management.

Client devices 350 may include one or more computing devices configured to perform one or more operations consistent with disclosed embodiments. For example, client devices 350 may include a desktop computer, a laptop, a server, a mobile device (e.g., tablet, smart phone, etc.), a set-top box, a gaming device, a wearable computing device, or other type of computing device. In some embodiments client devices 350 may be part of system 100 (FIG. 1A). In other embodiments, however, client devices 350 may be independent from system 100. Client devices 350 may include one or more processors configured to execute software instructions stored in memory, such as memory included in client devices 350, to perform operations to implement the functions described below. Client devices 350 may be configured for wired and/or wireless communications and may include software that when executed by a processor performs internet-related communication (e.g., TCP/IP) and content display processes. For instance, client devices 350 may execute browser software that generates and displays interfaces including content on a display device included in, or connected to, client devices 350. Client devices 350 may execute applications that allow client devices 350 to communicate with components over network 370 and display content in interfaces via display devices included in client devices 350.

Figure 4:
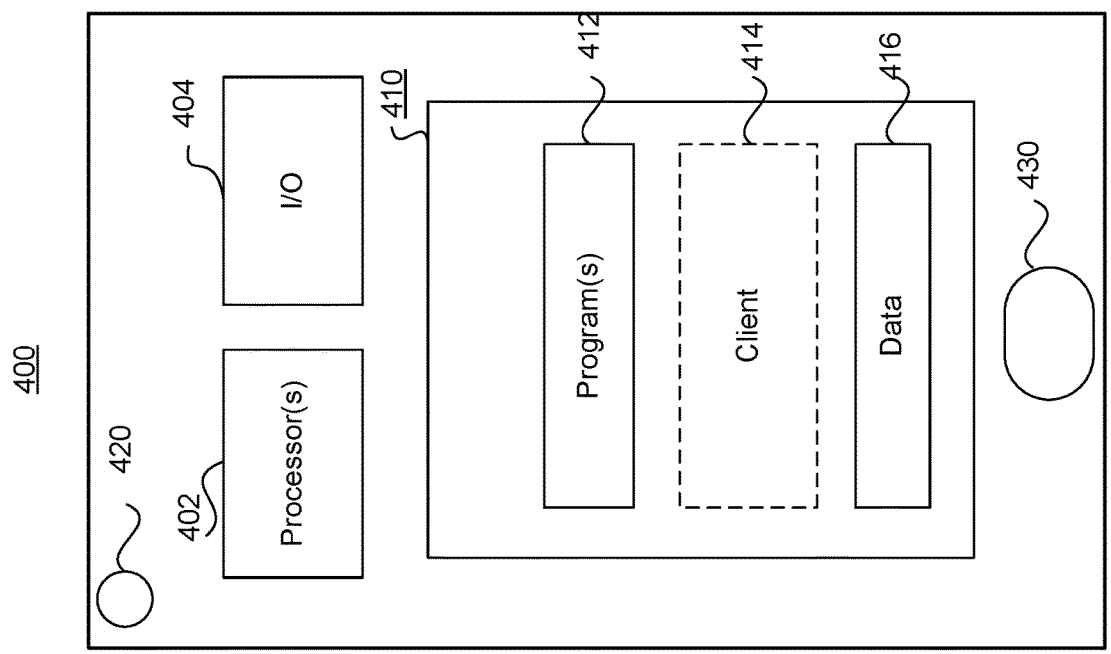
FIG. 4 is a block diagram of an exemplary client device, consistent with disclosed embodiments.

In some embodiments, as further disclosed in connection to FIG. 4, client devices 350 may run applications specifically configured to interact with scheduling system 320. Moreover, client devices 350 may store one or more accounts. For example, client devices 350 may store information about a worker account, including worker identification, password, location, and/or delivery preferences.

The disclosed embodiments are not limited to any particular configuration of client devices 350. For instance, a client device 350 may be a mobile device that stores and executes mobile applications to perform operations that provide functions offered by scheduling system 320 and/or online resources 340. In certain embodiments, client devices 350 may be configured to execute software instructions relating to location services, such as GPS locations. For example, client devices 350 may be configured to determine a geographic location and provide location data and time stamp data corresponding to the location data. Client devices 350 are further described in connection with FIG. 4.

Database 380 may include one or more computing devices configured with appropriate software to perform operations consistent with providing scheduling system 320 data for calculating delivery routes or performing transactions with client devices 350. Database 380 may include, for example, Oracle™ databases, Sybase™ databases, or other relational databases or non-relational databases, such as Hadoop™ sequence files, HBase™, or Cassandra™. Database 380 may include computing components (e.g., database management system, database server, etc.) configured to receive and process requests for data stored in memory devices of the database(s) and to provide data from the database(s).

While database 380 are shown separately, in some embodiments database 380 may be included in, or otherwise related to scheduling systems 320 or online resources 340.

Database 380 may be configured to collect and/or maintain the data associated with user accounts and user preferences. For example, database 380 may store information about user profiles for users of scheduling system 120. Database 380 may collect the data from a variety of sources, including, for instance, online resources 340. Further, database 380 may include information of the user delivery preferences. For example, database 380 may include information of whether the user is subscribed to dawn deliveries. Database 380 are further described below in connection with FIG. 5.

Third party systems 360 may include one or more servers or storage services provided by an entity related to scheduling system 320, such as a provider of services or a fulfillment center. Third party systems 360 may be connected to system 300 via network 370, but in other embodiments third party systems 360 may include direct connections with some elements of system 300. Further, third party systems 360 may be configured to provide and/or request information from scheduling system 320, or other elements of system 300. In some embodiments, while third party systems 360 may also be coupled to network 370, they may not be clients of scheduling system 320. Instead, third party systems 360 may include systems that include information of users or clients of scheduling system 320. For example, third party systems 360 may include servers of delivery contractors such as FedEx®, which may be used by scheduling system 320 when requiring additional resources to meet target schedules.

Client systems 390 may include one or more servers or storage services in communication with scheduling system 320 via network 370. In some embodiments, client systems 390 may send order requests to scheduling system 320, which may process in real-time the order requests using disclosed systems and methods. For example, client systems 390 may transmit data streams with order requests, which may include promised delivery, item info, and address of delivery, among other parameters. In such embodiments, the orders transmitted from client systems 390 may further include user information, location, transaction amount, IP address, and/or currency. Further, client systems 390 may operate Windows®, macOS®, or Linux® operating systems.

Network 370 may be any type of network configured to provide communications between components of system 300. For example, network 370 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 300. In other embodiments, one or more components of system 300 may communicate directly through a dedicated communication link(s). In yet other embodiments, network 370 may include multiple networks, organizing for example a network or networks.

It is to be understood that the configuration and boundaries of the functional building blocks of system 300 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Referring now to FIG. 4, there is shown a block diagram of an exemplary client device 350 (FIG. 3), consistent with disclosed embodiments. In some embodiments, client devices 350 may include transportation system mobile devices 107A, 107B, and 107C, or management system devices 119A-119C (FIG. 1A).

In one embodiment, client devices 350 may include one or more processors 402, one or more input/output (I/O) devices 404, and one or more memories 410. In some embodiments, client devices 350 may take the form of mobile computing devices such as smartphones or tablets, general purpose computers, or any combination of these components. Alternatively, client devices 350 (or systems including client devices 350) may be configured as a particular apparatus, embedded system, dedicated circuit, and the like based on the storage, execution, and/or implementation of the software instructions that perform one or more operations consistent with the disclosed embodiments. According to some embodiments, client devices 350 may include web browsers or similar computing devices that access web site consistent with disclosed embodiments.

Processor 402 may include one or more known processing devices, such as mobile device microprocessors manufactured by Intel™, NVIDIA™, or various processors from other manufacturers. The disclosed embodiments are not limited to any specific type of processor configured in client devices 350.

Memory 410 may include one or more storage devices configured to store instructions used by processor 402 to perform functions related to disclosed embodiments. For example, memory 410 may be configured with one or more software instructions, such as programs 412 that may perform operations when executed by processor 402. The disclosed embodiments are not limited to separate programs or computers configured to perform dedicated tasks. For example, memory 410 may include a single program 412 that performs the functions of the client devices 350, or program 412 may include multiple programs. Memory 410 may also store data 416 that may be used during scheduling system 320 operation to assign deliveries to the client device.

In certain embodiments, memory 410 may store instructions for accessing scheduling system 320. For example, memory 410 may include an application that communicates with scheduling system 320 via TCP/IP. Moreover, other software components may be configured to request information from scheduling system 320 or determine the location of client devices 350. For instance, these software instructions, when executed by processor(s) 402 may process information to display the status of a transaction.

I/O devices 404 may include one or more devices configured to allow data to be received and/or transmitted by client devices 350 and to allow client devices 350 to communicate with other machines and devices, such as other components of system 300. For example, I/O devices 404 may include a screen for confirming delivery of a parcel or providing information to the user. I/O devices 404 may also include components for NFC communication. I/O devices 404 may also include one or more digital and/or analog devices that allow a user to interact with client devices 350 such as a touch-sensitive area, buttons, or microphones. I/O devices 404 may also include one or more accelerometers to detect the orientation and inertia of client devices 350. I/O devices 404 may also include other components known in the art for interacting with scheduling system 320.

In some embodiments, client devices 350 may also include a camera 420 that capture images and may be used for verification of delivery completion. Additionally, or alternatively, client devices 350 may include a fingerprint sensor 430 that allows users to unlock client devices 350 and/or perform authentications. Both camera 420 and fingerprint sensor 430 may be operated by processor 402 and use encryption security to make it impossible for users to externally access fingerprint or camera information.

The components of client devices 350 may be implemented in hardware, software, or a combination of both hardware and software, as will be apparent to those skilled in the art.

Figure 5:
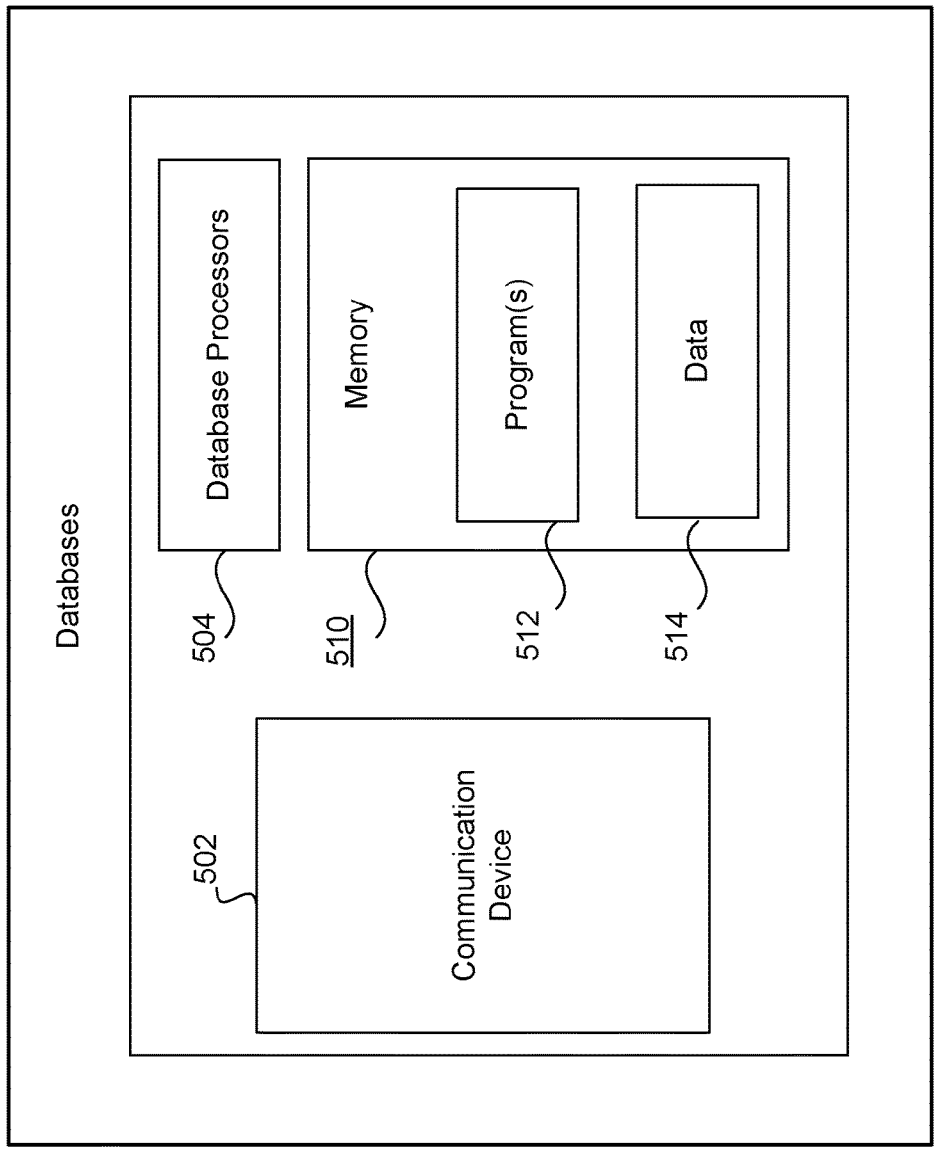
FIG. 5 is a block diagram of an exemplary database, consistent with disclosed embodiments.

Referring now to FIG. 5, there is shown a block diagram of an exemplary database 380 (FIG. 1), consistent with disclosed embodiments. In some embodiments, database 380 may be included in elements of system 100. For example, database 380 may be part of the FO system 113 or the WMS 119 (FIG. 1A).

Database 380 may include a communication device 502, one or more database processors 504, and database memory 510 including one or more database programs 512 and data 514. Database 380 may include NoSQL databases such as HBase, MongoDB™ or Cassandra™. Alternatively, database 380 may include relational databases such as Oracle, MySQL and Microsoft SQL Server.

In some embodiments, database 380 may take the form of servers, general purpose computers, mainframe computers, or any combination of these components. In some embodiments, database 380 are included within other elements of system 300, such as scheduling system 320. Other implementations consistent with disclosed embodiments are possible as well.

In some embodiments, database 380 may include both non-relational and embedded databases. For example, database 380 may include a non-relational database, such as an Hbase, and an embedded database, such as a RocksDB (e.g., a key-value store database).

Communication device 502 may be configured to communicate with one or more components of system 300 or system 100, such as online resources 340, scheduling system 320, or SCM system 117. In particular, communication device 502 may be configured to provide scheduling system 320 order information, user preferences and privileges, and/or historic trends for developing predictive models.

The components of database 380 may be implemented in hardware, software, or a combination of both hardware and software. For example, although one or more components of database 380 may be implemented as computer processing instruction modules, all or a portion of the functionality of database 380 may be implemented instead in dedicated electronics hardware.

Database memory 510 may include programs 512, which may include instructions to support handling of orders from client systems 390 and interactions between, for example, client devices 350 and scheduling system 320. Further programs 512 may include instructions to store information in real-time as it is processed by scheduling system 320.

Data 514 may also be data associated with websites, such as online resources 340, or user accounts from client devices 350. Data 514 may include, for example, information relating to users and their credentials to obtain content. Data 314 may also include content files and accumulation variables to evaluate historic trends associating fulfillment centers and orders.

Figure 6:
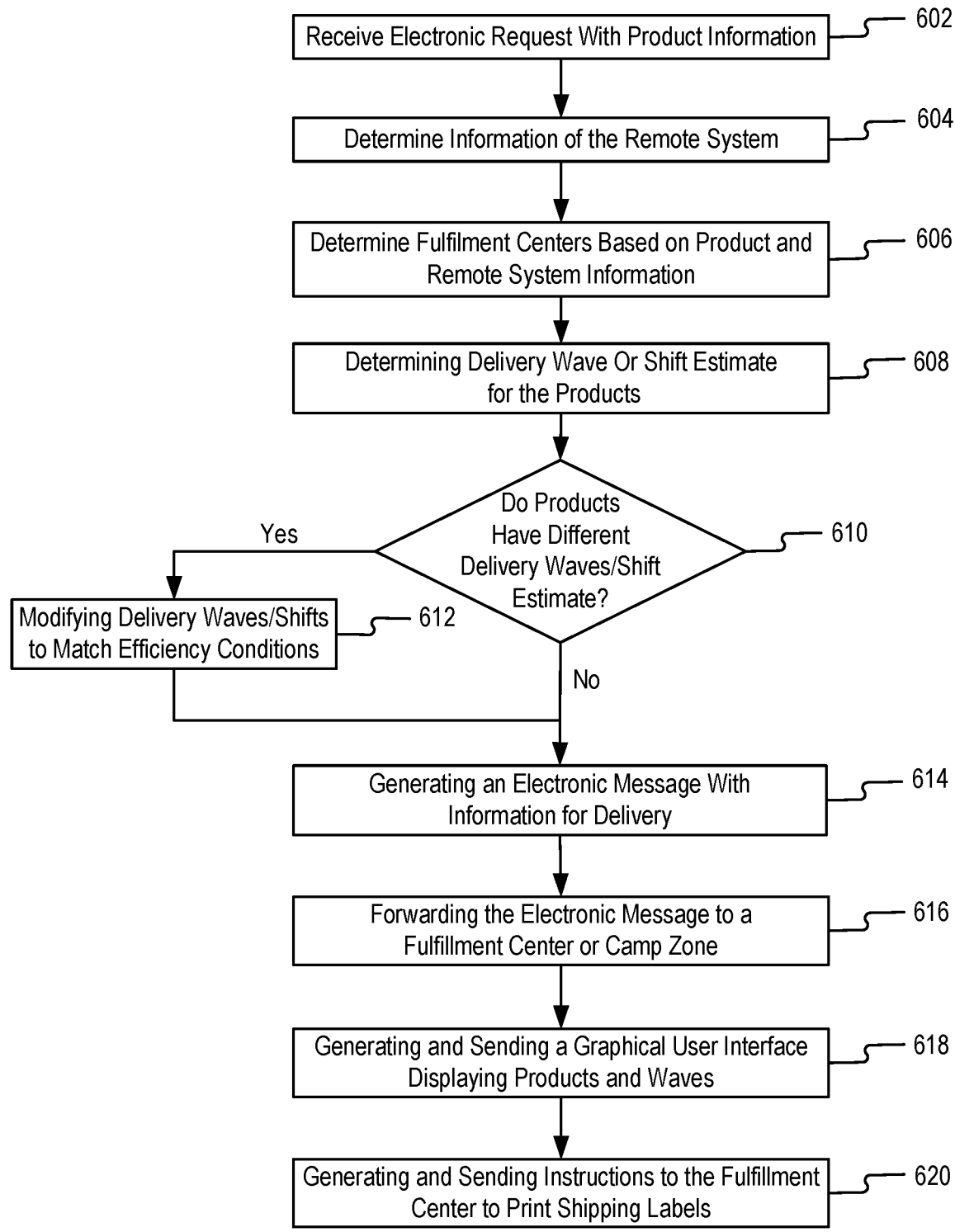
FIG. 6 is a flow chart of an exemplary product request handling process, consistent with disclosed embodiments.

FIG. 6 is a flow chart of an exemplary product request handling process 600, consistent with disclosed embodiments. In some embodiments, elements of system 300 may perform process 600. For example, as disclosed in the steps description below, scheduling system 320 may perform process 600. This is just an illustrative example of process 600, however, and in other embodiments system 100, or parts of system 100, may perform process 600. For example, Shipment Authority Technology System 101, FO System 113, and FC Auth 123 (FIG. 1A) may perform one or more of the steps in process 600.

In step 602, scheduling system 320 may receive an electronic request. The electronic request may be received from a remote location. For example, the electronic request may be received from a remote client system 390 (FIG. 3). Moreover, the electronic request may include product information (such as item ID and price) and delivery information (such as promised delivery date and/or specific instructions).

In step 604, scheduling system 320 may determine information of the remote system that sent the request. For example, when client system 390 sends the requests to scheduling system 320, scheduling system may identify information of client systems 390 based on the order information. For example, scheduling system 320 may identify postal code, customer information, preferences, region, address, and/or privileges based on the order information in step 604. Further, scheduling system 320 may identify a username, a postal code, a physical location, or user preferences in step 604.

In step 606, scheduling system 320 may determine one or more fulfilment centers that may complete and dispatch the order. The fulfilment center may be determined based on proximity to a postal code (identified for example in step 604), availability of products, and/or forecasted capacity for the target delivery date. In step 606, scheduling system 320 may also determine a region associated with the electronic request that may be used to identify target fulfillment centers. For example, scheduling system 320 may identify a fulfillment center that is within a radius of the postal code associated with the request received in step 602.

In some embodiments, as further described in connection to FIG. 9, determining the fulfilment center in step 606 may include using a predictive model or tool that is based on historic trends or previous orders. For example, to determine the fulfilment center, scheduling system 320 may perform operations of storing in database 380 (FIG. 3) a plurality of previous electronic requests and associated fulfillment centers and dividing the previous electronic requests in a training dataset and a validation dataset, the training dataset having more requests than the validation dataset. Scheduling system 320 may also perform operations of generating a predictive model based on the training data set associating request information and fulfillment centers, validating the predictive model using the validation dataset, and determining the fulfillment center by applying the predictive model to the electronic request.

In step 608, scheduling system 320 may determine a delivery process for the products. For example, as previously discussed, scheduling system 320 may operate using two-wave or two-shift processes. In step 608 scheduling system 320 may analyze forecasted data for the fulfillment centers identified in step 606 to determine which of the delivery processes best accommodate requirements for the order received in step 602. Moreover, in step 608 scheduling system 320 may classify the order depending on the delivery process. For example, if scheduling system 320 determines that the optimized delivery process is two-waves, in step 608 scheduling system 320 may also determine that the order should be categorized in the first wave, as further described in connection to FIG. 7. Alternatively, if scheduling system determines that the optimized delivery is two-shift, in step 608 scheduling system 320 may determine the order should be delivered in the first or second shifts. Moreover, in some embodiments determining delivery waves or shifts may be based on a cutoff time delivery for the order. For example, a cutoff time of 12:00 will require assignment of delivery in wave 1 (defined between 0:00-18:00).

In some embodiments, determining the delivery process for waves/shifts includes modifying the estimated delivery process based on a day and time period when the product will be delivered to camp zone 215 (FIG. 2). For example, a delivery wave estimate may be determined in step 608 based on promised time and date for a parcel. Further, the delivery wave estimate may be updated with FC 200 changes or updates. For example, a delivery wave estimate may be wave 1 for one type of FC 200 but be shift 2 for a second type of FC 200.

In step 610, scheduling system 320 may determine whether products in the order have been assigned to different waves or shifts. For example, if an order includes two products and the first product was assigned to wave 1, defined as delivery from 0:00-18:00, and the second product was assigned to wave 2, defined as delivery from 18:00-24:00, scheduling system 320 may determine that the two products have been assigned to different waves in step 610. Alternatively, the two products may have been assigned to different shifts. For instance, product 1 may have been assigned to a first shift, defined as a west area (covering 50% of the FC 200 region), while the second product may have been assigned to a second shift, defined as an east area (covering the remaining 50% of the FC 200 region). In such cases scheduling system 320 may also determine that the product have different shifts. Alternatively, or additionally, the two products may have been assigned to different delivery processes. For example, the first product may have been assigned to wave delivery (i.e., segregated by times) but the second product may have been assigned to shift delivery (i.e., segregated by area). In such cases, scheduling system 320 may also determine the products are assigned to different waves or shifts.

If in step 610 scheduling system 320 determines there are products that have different delivery waves or shifts (step 610: yes), process 600 may continue to step 612, in which scheduling system 320 may modify delivery waves or shifts to match efficiency conditions. When scheduling system 320 determines there is a conflict in the waves or shifts assigned to products, scheduling system 320 may apply deconflicting rules to modify the product assignments. The deconflicting rules may include changes in the last mile, such as changes in location, time, route and/or priority. Further, the deconflicting rules may include modifying order promise (updating at a delivery time, while using timeslots), modify the location of camp zone 215 or FC 200 (reassigning efficient delivery schedules), or modifying agreed upon timeslot in direct customer-courier contact. Finally, deconflicting rules may include separating shipments when, for example, deconflicting rules are uncapable of achieving promised delivery date in a single shipment.

If, however, scheduling system 320 determines products do not have different delivery waves or shifts (step 610: no), process 600 may skip step 612 and continue directly to step 614. In step 614, scheduling system 320 may generate an electronic message with information for delivery, or the multiple deliveries if they are needed. The electronic message may include information of the determined fulfillment centers, products to be shipped, a time of day, and a delivery wave or shift estimate. The electronic message may be configured as a TCP/IP message being directed to one or more elements in system 100 and/or client devices 350. In other embodiments, the electronic message of step 614 may configured for printing labels at camps or fulfilment centers. For example, the electronic message may already include printing information because a seamless integration between systems relieves manager of manual entry of order information when producing shipping labels. The electronic message in step 614 may be configured to allow automatic printing of shipping labels. For example, the electronic message in step 614 may be directly configured in Line Printer Daemon protocol/Line Printer Remote protocol (or LPD, LPR) for networked printers. Alternatively, or additionally, the electronic message in step 614 may be configured in Internet Printing Protocol (IPP), or (Common UNIX Printing System) CUPS. Thus, the electronic message may be configured to print shipping labels as further discussed in connection with FIG. 11.

In step 616, scheduling system 320 may forward or send the electronic message of step 614 to a fulfilment center or camp that has been identified for completing the order. In some embodiments, the electronic message may be transmitted through a network to administrator servers that then relay the information to the corresponding managers or workers. Alternatively, or additionally, the electronic message may be transmitted directly to mangers or devices. For example, electronic messages may be directly transmitted to printers to automatically print labels for parcels.

In step 618, scheduling system 320 may generate one or more graphical user interfaces (GUIs) for displaying products and/or their associated waves. The GUIs may be configured for displaying in an administrator screen. For example, the GUIs may be configured to be displayed in screens of LMS 125 (FIG. 1A). Alternatively, GUIs may be configured to be displayed in screens of client devices 350, which may be operated by delivery workers to get notifications and/or task assignments. Exemplary GUIs generated in step 618 are further described in connection to FIGS. 10 and 12A-12H.

In step 620, scheduling system 320 may generate and send instructions to the fulfillment center to print shipping labels. For example, in embodiments where the electronic message is not directed immediately for the printer but is a TCP/IP message, scheduling system 320 may generate printing instructions for printing shipping labels. The instructions for printing shipping labels may include color-coded labels for different waves or shifts. Furthermore, the instructions may include priority notices, such as "dawn delivery" or "premium delivery."

Figure 7:
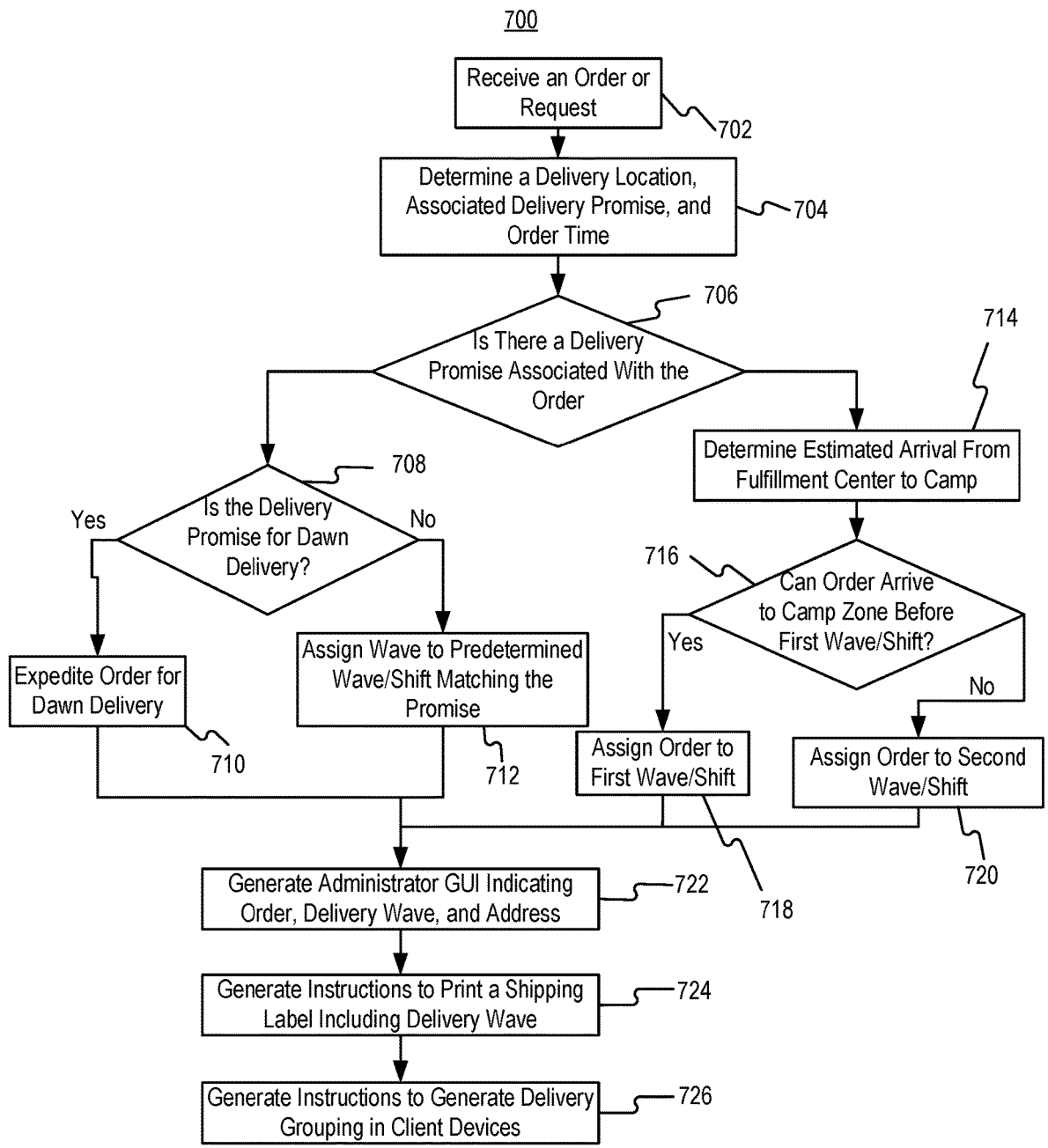
FIG. 7 is a flow chart of an exemplary delivery classification process, consistent with disclosed embodiments.

FIG. 7 is a flow chart of an exemplary delivery classification process 700, consistent with disclosed embodiments. In some embodiments, elements of system 300 may perform process 700. For example, as described below, scheduling system 320 may perform process 700. In other embodiments, however, process 700 and in other embodiments system 100, or parts of system 100, may perform process 700. For example, Shipment Authority Technology System 101, FO System 113, and FC Auth 123 (FIG. 1A) may perform one or more of the steps in process 700.

In step 702, scheduling system 320 may receive an order or request. For example, scheduling system 320 may receive an order from client system 390 or a request from third party systems 360. In some embodiments, the order may have similar characteristics to the order received in step 602, including customer information, product information, and delivery promises.

In step 704, scheduling system 320 may determine a delivery location, an associated delivery promise, and an order time based on the received order or request. For example, in step 704 scheduling system 320 may determine a postal code, customer info, and costumer preferences based on the received order information.

In step 706, scheduling system 320 may determine whether there is a delivery promise associated with the order. For example, some orders may include a delivery promise of "dawn delivery." In contrast, other orders or request may not be associated with any promise. In step 706, scheduling system 320 may decode information in the order or request to determine if there is a delivery promise. If scheduling system 320 determines there is a delivery promise (step 706: yes), scheduling system 320 may continue to step 708.

In step 708, scheduling system 320 may determine if there is a promise for "dawn delivery" or if the promise is for an alternative delivery time. If the promise is for dawn delivery (step 708: yes), scheduling system 320 may continue to step 710 and expedite order for delivery. Expediting the delivery may include generating a GUI for the administrator notifying that a dawn delivery is incoming. Further expediting the order for dawn delivery may include generate notification GUI's for client devices 350 and specific printing instructions. If the promise is not for dawn delivery (step 708: no), scheduling system 320 may continue to step 712 and assign a wave or shift matching the promise. For example, if the promise is for delivery at 20:00, scheduling system 320 may assign the order to a wave 2, defined as 18:00-24:00.

If in step 706 scheduling system 320 determines that there is no delivery promise associated with the order (step 706: no), scheduling system 320 may continue to step 714 and determine an estimated arrival of the order from the fulfilment center to the camp. For example, after identifying a fulfilment center, scheduling system 320 may estimate arrival to delivery camp based on historic trends, distance, and/or delivery rotations.

In step 716, scheduling system 320 determines whether the order can arrive to the delivery camp before the first wave or shift. If scheduling system 320 determines the order may arrive before (step 716: yes), scheduling system 320 may continue to step 718 and assign the order to the first wave or shift. However, if scheduling system 320 determines that the order cannot arrive before the first (step 716: no), scheduling system 320 may assign the order to a second wave or shift in step 720.

As shown in FIG. 7, different steps of process 700 may converge in step 722, in which scheduling system 320 may generate GUIs for indicating order, delivery wave, shift wave, and/or addresses. That is, regardless of the specific wave/shift or priority assigned to the order, process 700 may generate GUIs for administrator and/or workers based on the order categorization.

In step 724, scheduling system 320 may generate instructions to print a shipping label including the delivery wave/ shift. As further discussed in connection to FIG. 11, the shipping label may include indications for delivery process, such as delivery wave or shift number.

In step 726, scheduling system 320 may generate instructions for displaying delivery grouping options in client devices 350. For example, as further discussed in connection to FIG. 12G, scheduling system 320 may generate instructions for grouping in notifications in client devices 350 based on the assignments for orders during process 700.

Figure 8:
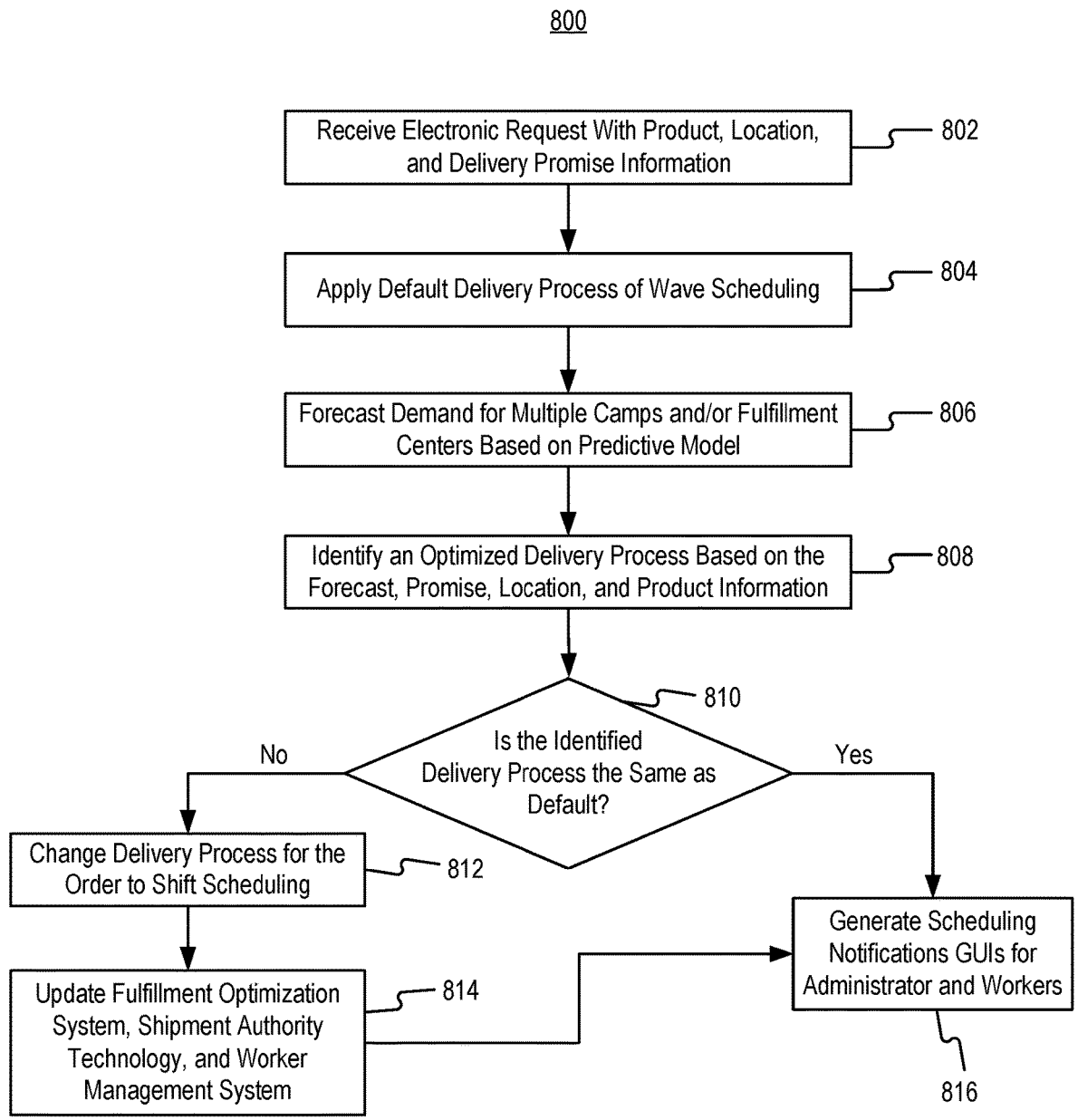
FIG. 8 is a flow chart of an exemplary delivery optimization process, consistent with disclosed embodiments.

FIG. 8 is a flow chart of an exemplary delivery optimization process, consistent with disclosed embodiments. In some embodiments, elements of system 300 may perform process 800. For example, as described below, scheduling system 320 may perform process 800. Process 800 may alternatively be performed by system 100, or parts of system 100. For example, Shipment Authority Technology System 101, FO System 113, and FC Auth 123 (FIG. 1A) may perform one or more of the steps in process 800.

In step 802, scheduling system 320 may receive an electronic request with product, location, and delivery promise information. The electronic request may be similar to the request that is received in step 602 (FIG. 6).

In step 804, scheduling system 320 may apply a default delivery process of wave scheduling. Wave scheduling may have better coverage of the area and facilitates logistics to meet guaranteed dates. Thus, in step 804, scheduling system 320 may default to wave scheduling process, to initially guarantee meeting delivery promises.

In step 806, scheduling system 320 may forecast demand for multiple camps and/or fulfilment centers based on predictive models. As further disclosed in connection to FIG. 9, scheduling system 320 may forecast demand using previous data to train and validate predictive models. For example, scheduling system 320 may generate predictive models based on random forests to estimate demand in each fulfilment center based on historic data of its performance.

In step 808, scheduling system 320 may identify an optimized delivery process based on the forecast, promise, location, and product information. In step 808 scheduling system 320 may perform a computation of delivery routes based on the default delivery process. For example, scheduling system 320 may generate nodes for customer locations, compute the travel time between each pair of customers and camp zone 215 (or FC 200), and assign chosen locations to the nearest available address. In some embodiments, distances between each pair of destinations may be computed with the Manhattan distance. Scheduling system 320 may then compute delivery routes and constrain delivery routes based on worker hours, driver capacity, and traffic. Then, each one of the routes is optimized by distance, number of workers, and number of required visits to camps.

In some embodiments, scheduling system 320 may identify an optimized delivery process using combinatorial optimization. Scheduling system 320 may compute cost-efficient delivery routes by utilizing heuristics for each vehicle routing. For instance, scheduling system 320 may use the Clark-Wright Savings algorithm, or similar methods, to identify optimized delivery processes. In such embodiments, optimized delivery processes may be identified based on minimal travel time. Alternatively, or additionally, scheduling system 320 customers to spatial clusters and algorithms to enhance delivery efficiencies. In such embodiments, clusters may be computed for each delivery day in such a way that they do not exceed a maximum number of customers per route.

Once an optimized delivery process is identified, scheduling system 320 may continue to step 810 and determine if the identified delivery process is the same as the default delivery process. For example, if the optimization of step 808 indicates that an optimized delivery process is wave-delivery, then scheduling system 320 would determine that the optimized delivery process matches the default delivery process (step 810: yes). However, if the optimization of step 808 indicates that an optimized delivery process is shift-delivery, then scheduling system 320 would determine that the optimized delivery process does not match the default delivery process (step 810: no).

If scheduling system 320 determines the delivery process does not match (step 810: no), scheduling system 320 may continue to step 812 and change the delivery process to the optimized delivery. For example, in step 812 scheduling system 320 may switch the delivery process for a group of orders from wave delivery to shift delivery based on the forecast and optimization of steps 806 and 808.

In step 814, scheduling system 320 may update elements of system 100 and/or system 300 according to the optimized delivery process. For example, scheduling system 320 may update FO system 113, shipment authority technology system 101, SCM system 117, WMS 119, and LMS 125 (FIG. 1A).

In step 816, scheduling system 320 may generate scheduling notification GUIs for administration or workers. For example, updates to the delivery process may also include transmitting notifications to client devices 350 and/or updating GUI's in administration screens, as further discussed in connection to FIG. 9. Further, changes in delivery processes based on the optimization may be reflected in the printing instructions.

With process 800, scheduling system 320 may improve the technical field of automated delivery scheduling because it creates an adaptive system that can choose between different delivery processes based on optimization variables. While current systems require system managers to manually select between different delivery processes (e.g., between wave or shift delivery), process 800 allows using demand forecasts to dynamically adapt the system based on optimization conditions. Indeed, the forecasting and optimization described in steps 806-808, enable frequent and concurrent selection of delivery processes. Thus, process 800 shows a particular computerized method for operating the parcel delivery system with improved technical advantages.

Figure 9:
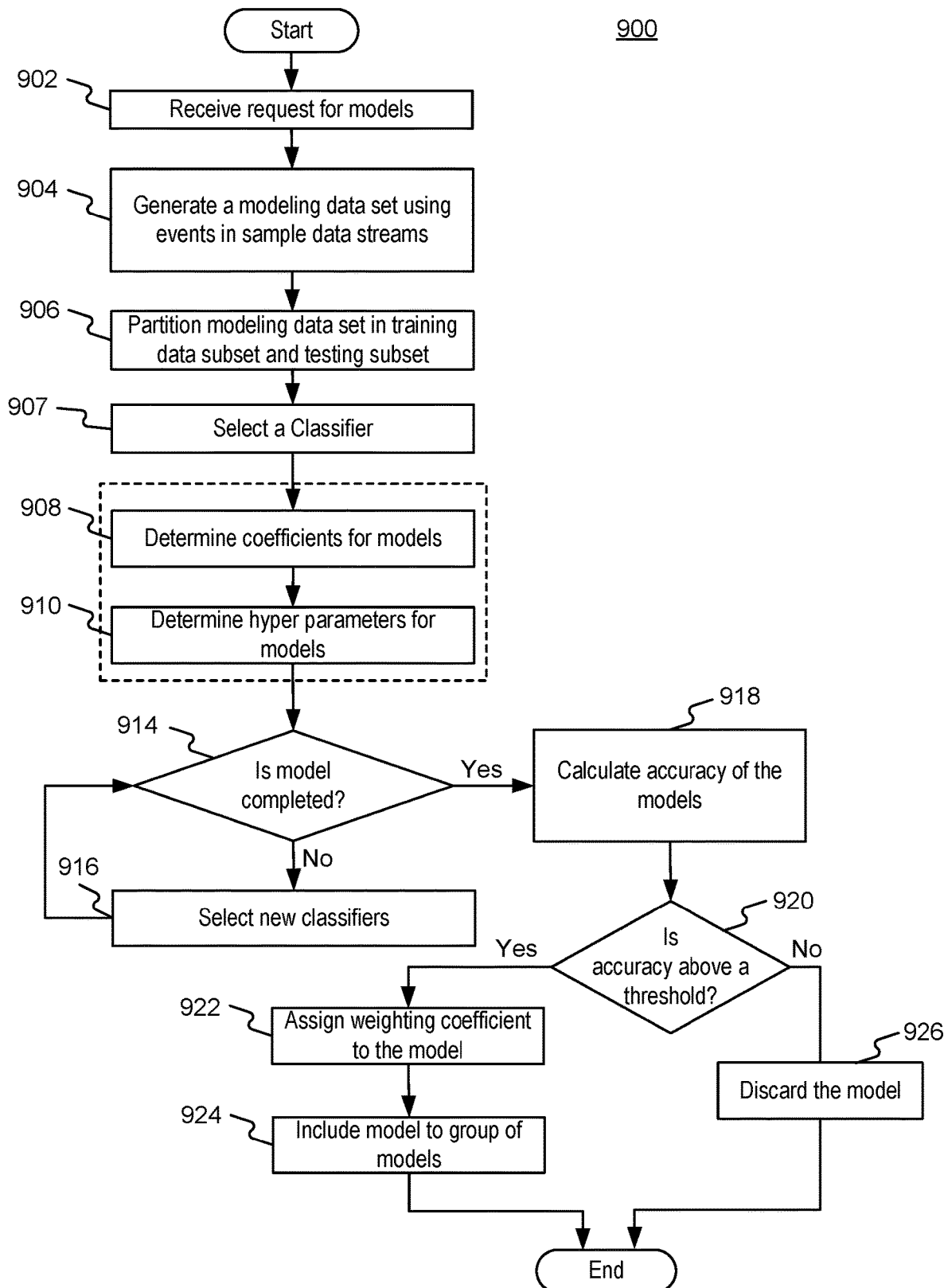
FIG. 9 is an exemplary flow chart illustrating a predictive model training process, consistent with disclosed embodiments.

FIG. 9 is an exemplary flow chart illustrating a predictive model training process 900, in accordance with disclosed embodiments. In some embodiments, elements of system 300 may perform process 900. For example, as described below, scheduling system 320 may perform process 900. This is just an illustrative example of process 900, however, and in other embodiments system 100, or parts of system 100, may perform process 600. For example, Shipment Authority Technology System 101, FO System 113, and FC Auth 123 (FIG. 1A) may perform one or more of the steps in process 900.

In step 902, scheduling system 320 may receive a request for prediction models for demand in fulfillment centers. In some embodiments, the request may specify a target FC 200 or camp zone 215 (FIG. 2). The request may include information about client devices 350 or former order information. Further the request may come from client devices 350.

In step 904, scheduling system 320 may generate a modeling data set. Scheduling system 320 may generate the modeling data set using information from database 380, online resources 340, and/or client devices 350. For example, scheduling system 320 may retrieve, from database 380, historic trends of orders and their corresponding fulfillment centers. The previous order data may also include performance metrics, including distance between deliveries, failed promised dates, and parcel priorities.

In step 906, scheduling system 320 may create modeling data subsets by dividing modeling data sets generated in step 904. For example, scheduling system 320 may divide the modeling data set in a training data subset and a validation data subset. In some embodiments, the training and validation data sets may be randomly created by aleatory selection of elements from the modeling data set for each subset. In other embodiments, however, scheduling system 320 may divide the data with a predetermined rule. In some embodiments, elements in the modeling data subsets may be unique to each subset to create independent training data and validation subsets. Alternatively, modeling data subsets may share elements and overlap. In other embodiments, scheduling system 320 may divide the modeling data set using division rules. The modeling data set division rules may indicate the number of divisions and/or ratios between different groups. For example, the modeling data set may be divided using an 80/20 split for testing and validation data.

Based on the modeling data set partitioning, scheduling system 320 may select a classifier in step 907. Scheduling system 320 may also process the modeling data set of step 906 to determine coefficients (step 908) and hyper parameters (step 910) for a prediction model. The prediction models may be specific for FC 200 demand and may be parametric, non-parametric, or semi-parametric. For instance, in some embodiments, scheduling system 320 may create a plurality of decision trees as prediction models to identify a probability of fraud. In other embodiments, scheduling system 320 may generate neural networks, Group Method of Data Handling (GMDH) algorithms, Naive Bayes classifiers, and/or Multivariate Adaptive Regression Splines. Alternatively, or additionally, scheduling system 320 may generate models based on linear regressions, random forests, and/or logistic regressions. For example, scheduling system 320 may develop a random forest model to predict demand in both FC 200 and camp zone 215. Having parameters like day of the week, time, order type, and destination address, models generated in steps 906-910 may create a tool for forecasting demand in fulfillment centers or camps, and the ability to meet delivery goals.

In step 914, scheduling system 320 may evaluate if the model is completed or if it has reached a stopping criteria. For example, when scheduling system 320 generates decision trees, in step 914 scheduling system 320 may evaluate if a stopping criteria is fulfilled for the end nodes. In some embodiments, stopping criteria may be intrinsic to the model or defined by hyper parameters.

If the stop criteria in not fulfilled, scheduling system 320 may continue to step 916 and select a new variables or parameters to determine new classifiers. For example, to variables of delivery date and time, scheduling system 320 may include variables of delivery preferences or costumer privileges. Alternatively, when the stop criteria is fulfilled, scheduling system 320 may continue to step 918, in which scheduling system 320 may calculate the accuracy of the model using a portion of the training data set.

In step 920, scheduling system 320 may evaluate whether the accuracy for the model is above an accuracy threshold. In some embodiments, the accuracy threshold for the model may be automatically adjusted based on optimization objectives set for the prediction models. If the accuracy for the model is not above the threshold (step 920: no) the model may be discarded in step 926. If the calculated accuracy is above the threshold (step 920: yes), scheduling system 320 may assign a weighted coefficient to the model in step 922 and include the model to the set of models in step 924. The weighted coefficient may be associated with the calculated accuracy. For example, the weighted coefficient may be proportional to the accuracy.

Process 900 may be repeated a plurality of times to generate a plurality of models. In some embodiments, scheduling system 320 may repeat the process until a minimum of models is generated.

FIG. 10 is a front view of an exemplary graphical user interface (GUI) 1000 in an administrator device, consistent with disclosed embodiments. GUI 1000 may be displayed on devices of management system 119 (e.g., devices 119A-119C) and may be updated as orders are being received. GUI 1000 may be displayed also in other devices of system 100, such as devices in internal front-end system 105 (FIG. 1A).

GUI 1000 includes a plurality of rows 1002 ($a$)-($n$). Each one of the rows 1002 may identify a parcel to be delivered. For example, each one of the rows 1002 may be associated with orders received in, for example, step 602 (FIG. 6).

As shown in FIG. 10, GUI 1000 may include a plurality of columns detailing different fields of information for each one of rows 1002. GUI 1000 may include a tracking number column 1004, a shipper name column 1006, a customer ID column 1008, a date column 1010, and a delivery process column 1012. In some embodiments, the delivery process column 1012 may specify which wave or shift the order has been assigned with for example process 900 (FIG. 9). Delivery process column 1012 may also indicate whether the order is scheduled for dawn delivery.

Moreover, GUI 1000 may include an action column 1014 that allows a system manager to execute an action for the order in the corresponding row 1002. The action may include print shipping label, delete, modify, and or/reassign.

Figure 11:
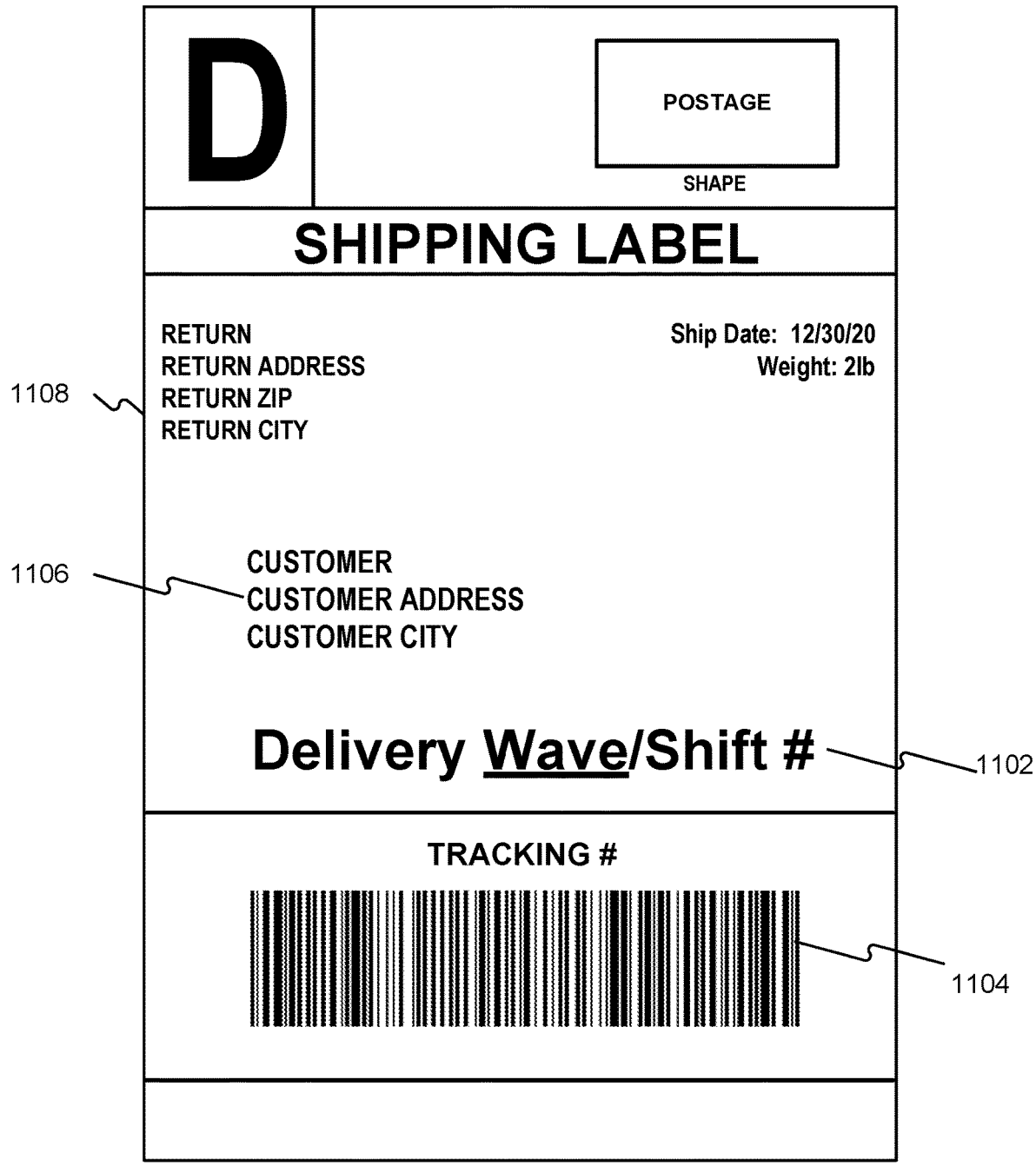
FIG. 11 is an exemplary shipping label, consistent with disclosed embodiments.

FIG. 11 is an exemplary shipping label 1100, consistent with disclosed embodiments. Shipping label 1100 may be generated in step 620 (FIG. 6) or step 724 (FIG. 7).

Shipping label 1100 may include a delivery process note 1102. Delivery process note 1102 may specify a wave or shift delivery, or a dawn or overnight delivery. Shipping label 1100 may also include a bar code 1104, destination address 1106, and return address 1108. As previously discussed in connection to FIG. 6, in some embodiments shipping label 1100 may be automatically generated and printed based on classifications or categorizations.

Figure 12A:
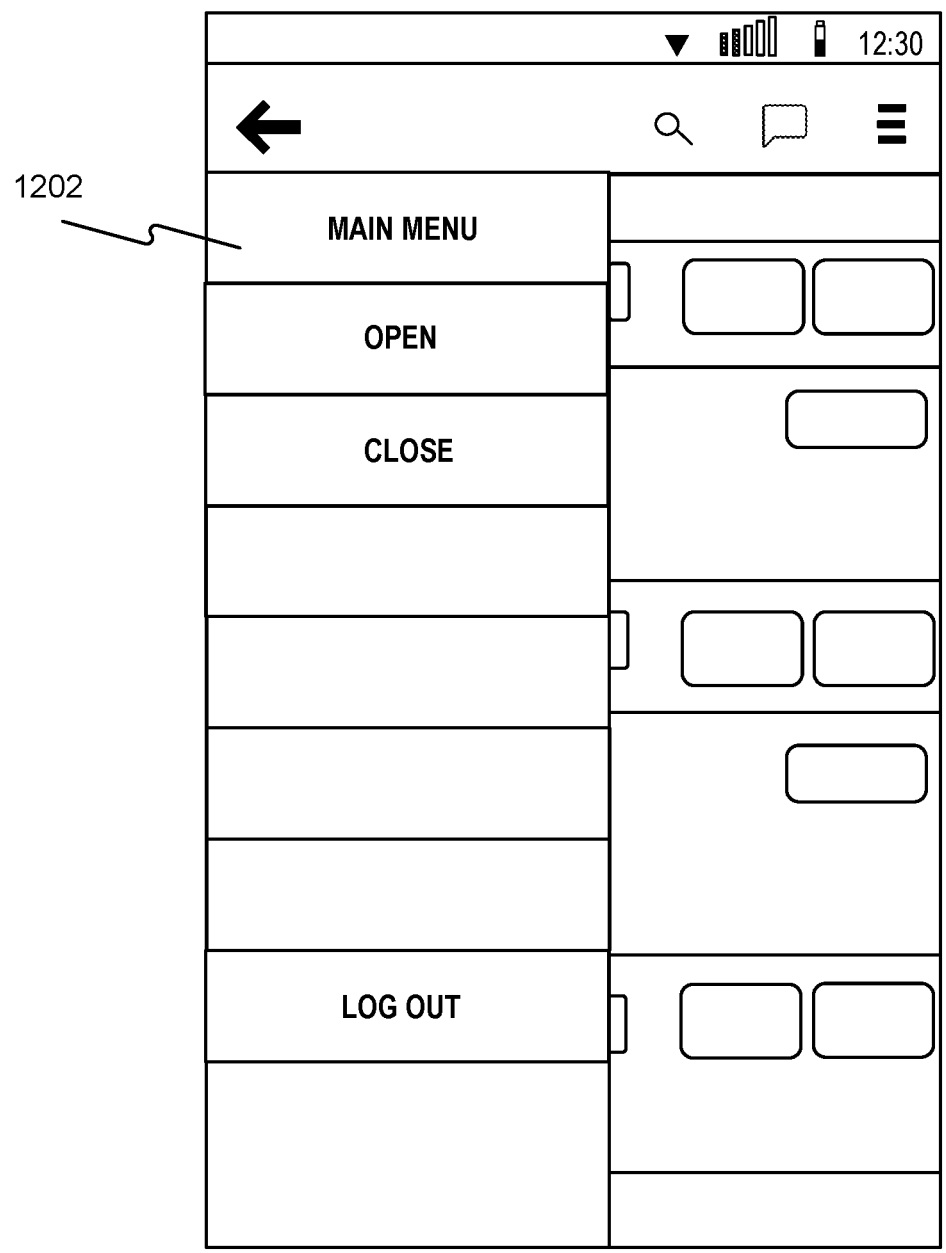
FIG. 12A is a front view of a first exemplary graphical user interface in a mobile device, consistent with disclosed embodiments.

FIG. 12A is a front view of a first exemplary graphical user interface (GUI) 1201 in a mobile device, consistent with disclosed embodiments. GUI 1201 shows a schematic of a home menu 1202 for a delivery service application.

Figure 12B:
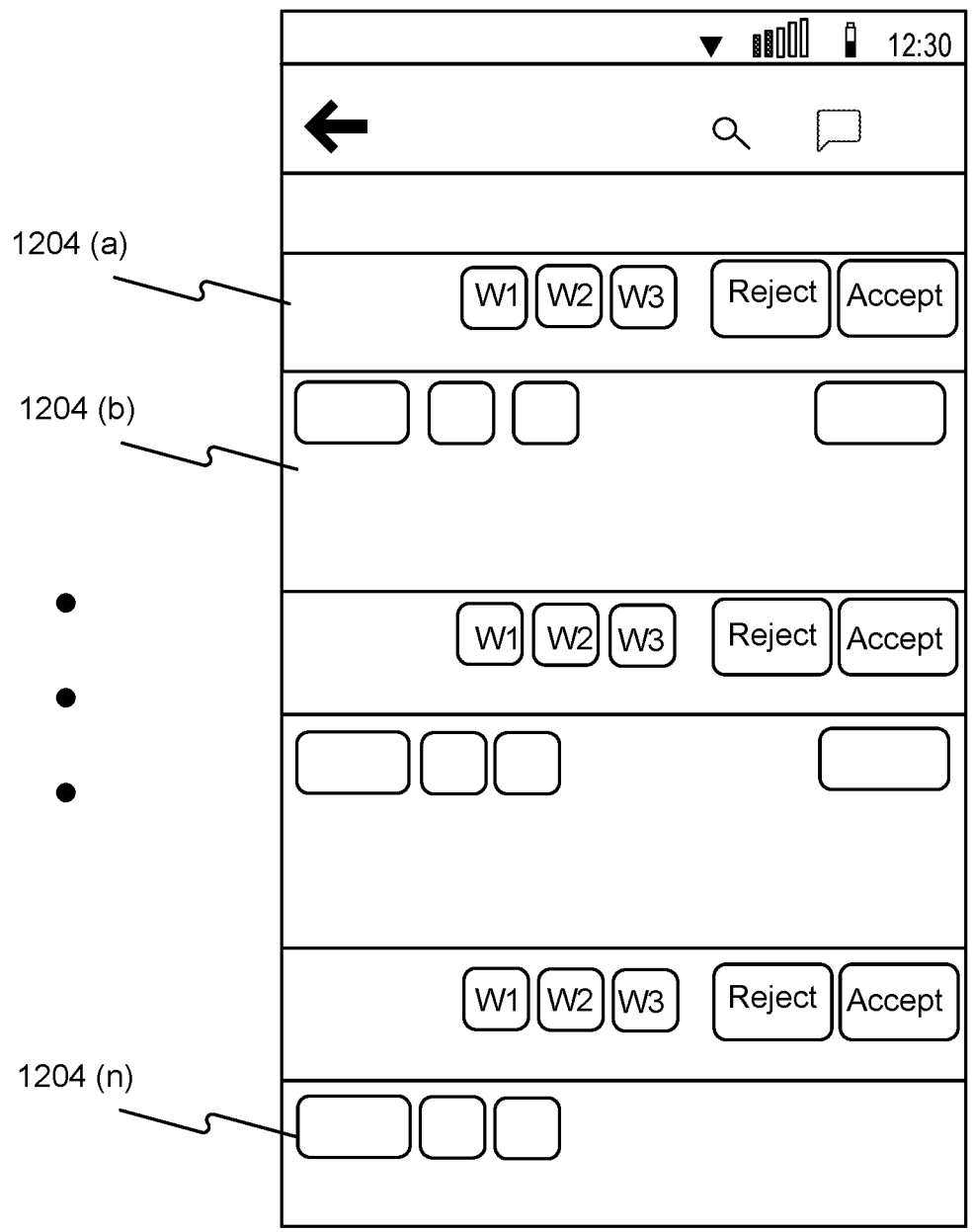
FIG. 12B is a front view of a second exemplary graphical user interface in a mobile device, consistent with disclosed embodiments.

FIG. 12B is a front view of a second exemplary graphical user interface (GUI) 1203 in a mobile device, consistent with disclosed embodiments. GUI 1203 shows a list of deliveries 1204($a$)-1204($n$). For each one of deliveries 1204, GUI 1203 displays a plurality of buttons for accepting, rejecting, and completing actions, among others.

Figure 12C:
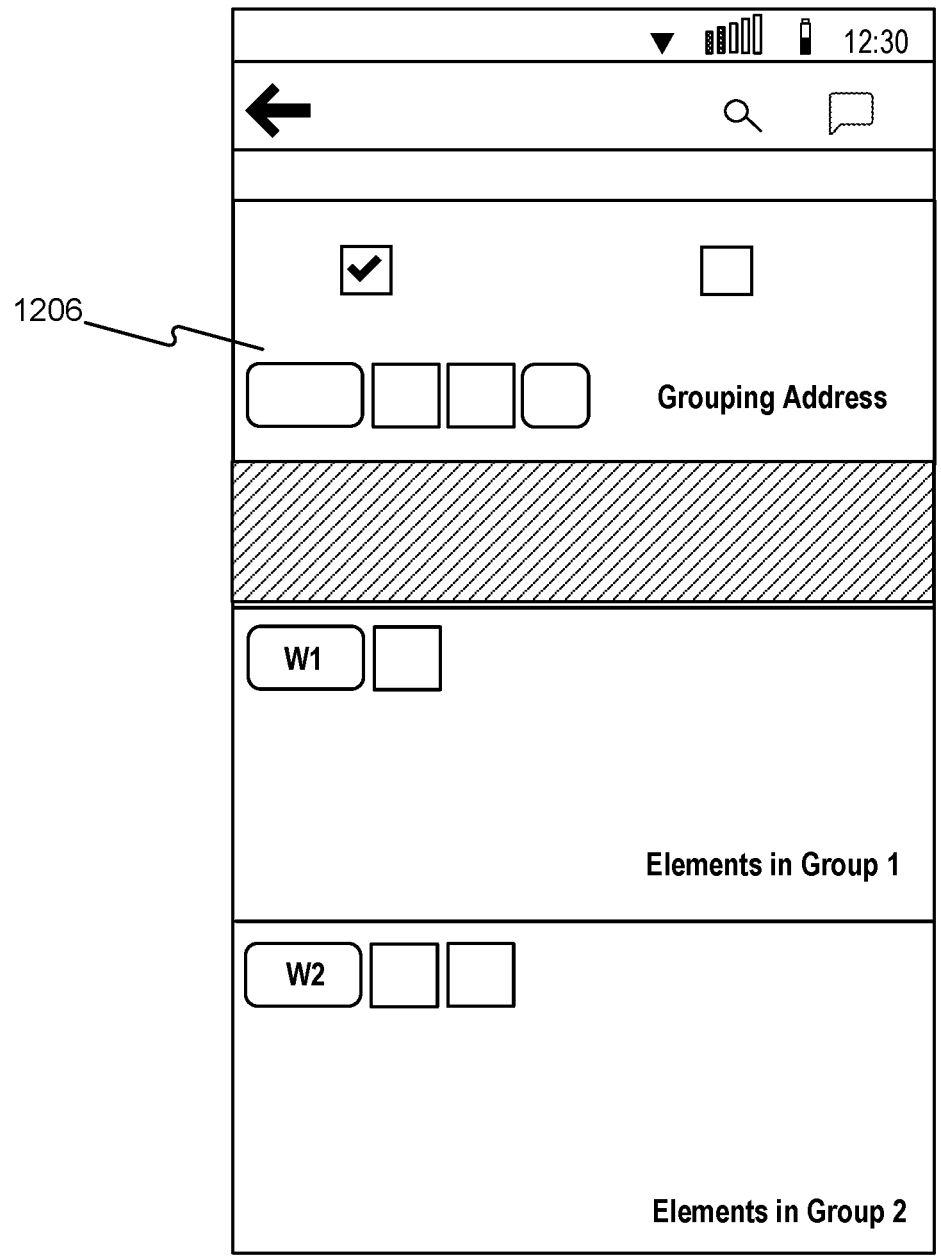
FIG. 12C is a front view of a third exemplary graphical user interface in a mobile device, consistent with disclosed embodiments.

FIG. 12C is a front view of a third exemplary graphical user interface (GUI) 1205 in a mobile device, consistent with disclosed embodiments. GUI 1205 shows a grouping option banner 1206. Based on the delivery process (i.e., wave delivery or shift delivery), banner 1206 gives users the option to manually adapt the delivery in different groupings. For example, users of client devices 350 may update the system directly in their mobile phones when they have suggestions to adapt the delivery process. In some situations, a worker may have more updated knowledge of delivery capabilities. Road accidents or other unforeseeable situations may impede delivery with the optimized schedules automatically performed by, for example, scheduling system 320. GUI 1205 allows users to provide feedback and propose different groupings for delivery.

Figure 12D:
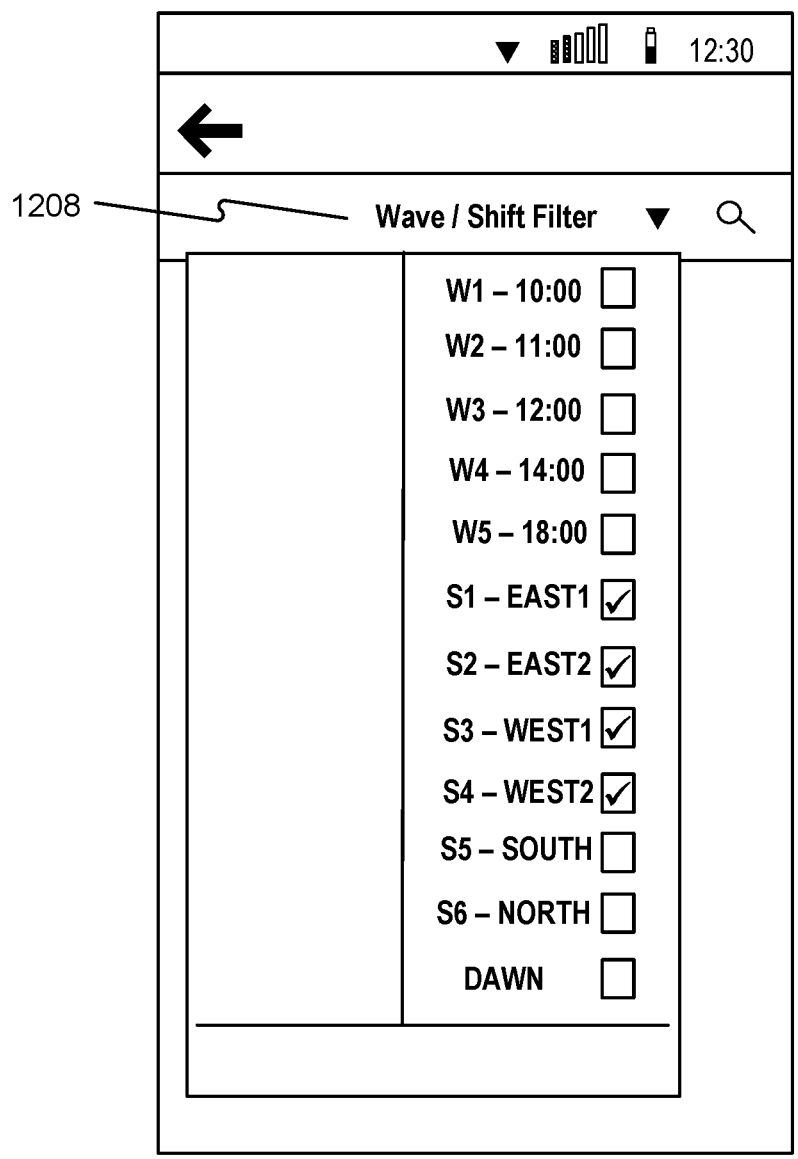
FIG. 12D is a front view a fourth exemplary graphical user interface in a mobile device, consistent with disclosed embodiments.

FIG. 12D is a front view a fourth exemplary graphical user interface (GUI) 1207 in a mobile device, consistent with disclosed embodiments. To address technical issues of having multiple items all showed in the limited screen space of a mobile phone, GUI 1207 shows a filter 1208. Filter 1208 may be used reduce the number of deliveries 1204 displayed in the mobile phone. Filter 1208 may operate by selecting order based on delivery process, delivery wave, and/or delivery area.

Figure 12E:
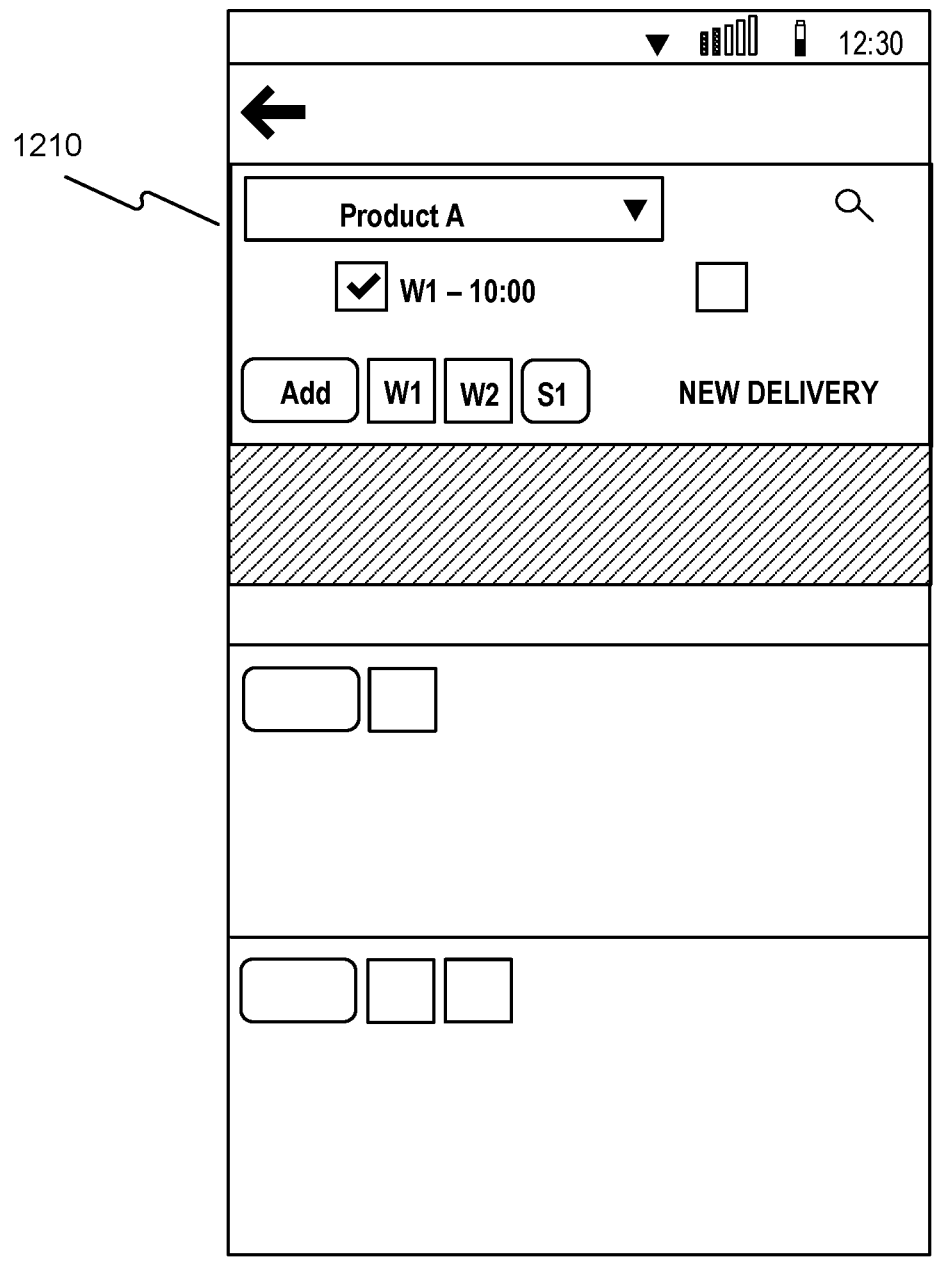
FIG. 12E is a front view of a fifth exemplary graphical user interface in a mobile device, consistent with disclosed embodiments.

FIG. 12E is a front view of a fifth exemplary graphical user interface (GUI) 1209 in a mobile device, consistent with disclosed embodiments. GUI 1209 shows a new delivery banner 1210 to add new deliveries that are being displayed in the screen. Moreover, banner 1210 may allow users to request additional deliveries or inform pending deliveries cannot be completed.

Figure 12F:
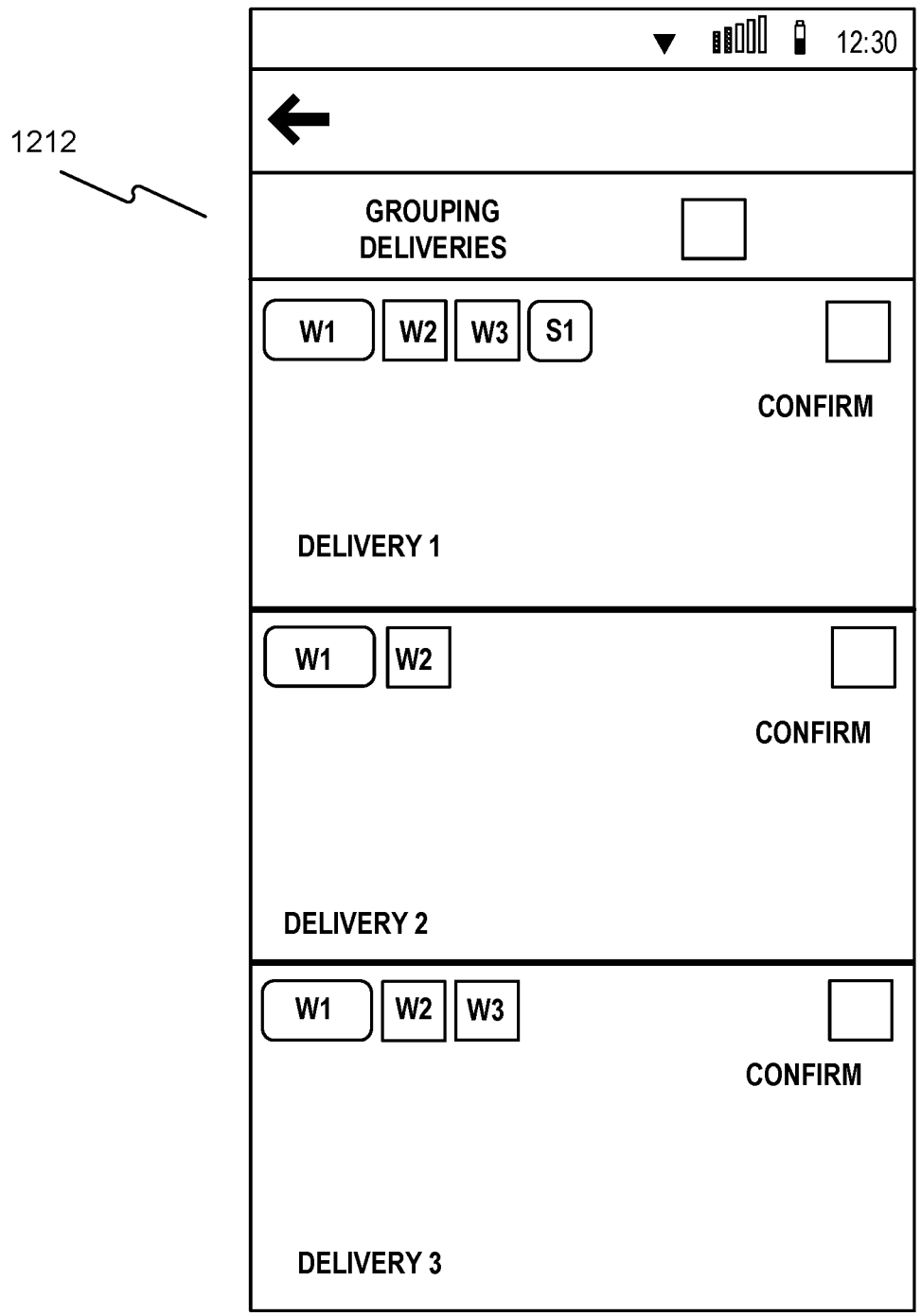
FIG. 12F is a front view of a sixth exemplary graphical user interface in a mobile device, consistent with disclosed embodiments.

FIG. 12F is a front view of a sixth exemplary graphical user interface (GUI) 1211 in a mobile device, consistent with disclosed embodiments. GUI 1211 shows options to group deliveries 1212. As shown in FIG. 12F, GUI 1211 associates each one of the deliveries 1212 with a grouping icon.

Figure 12G:
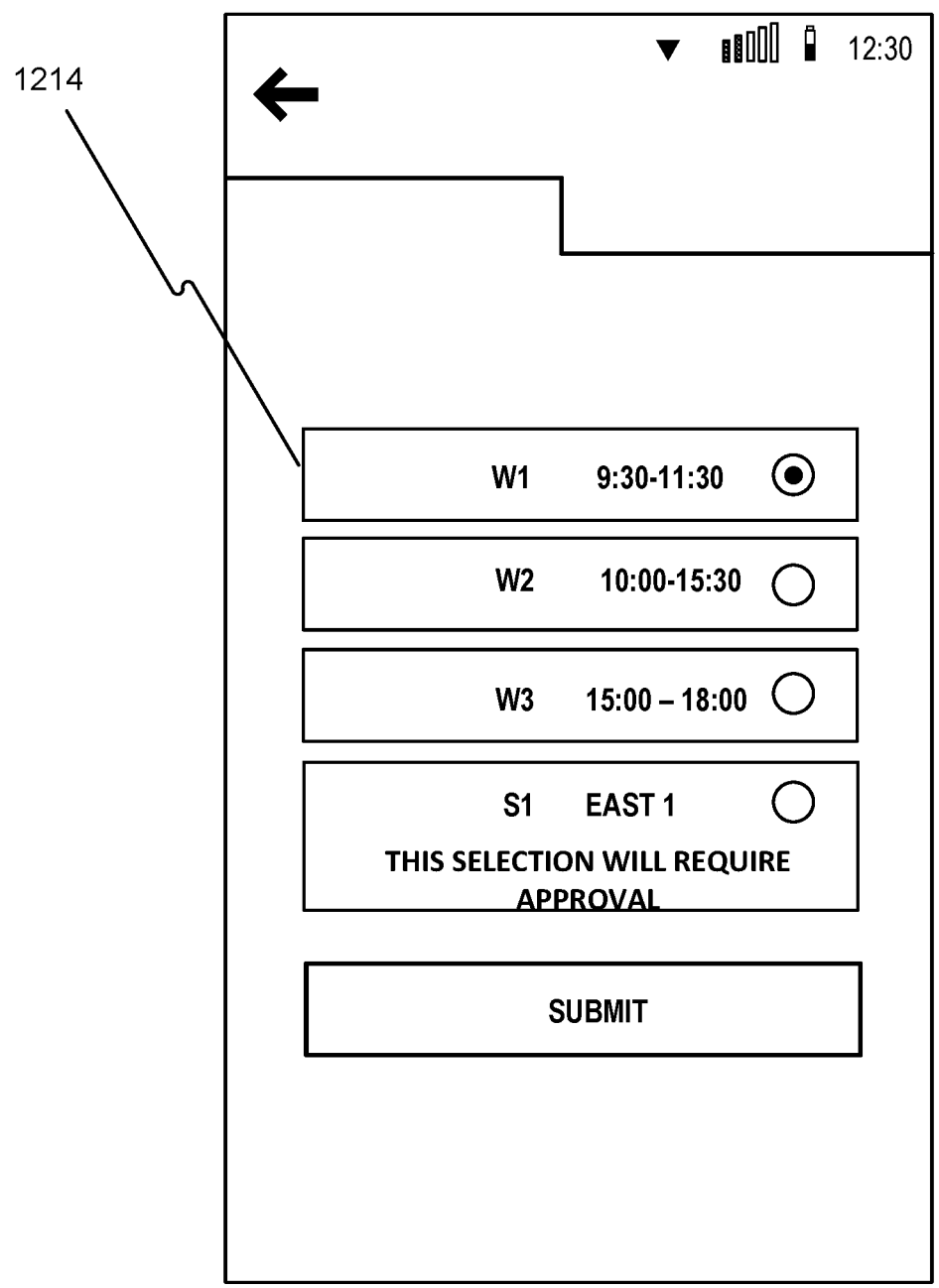
FIG. 12G is a front view of a seventh exemplary graphical user interface in a mobile device, consistent with disclosed embodiments.

FIG. 12G is a front view of a seventh exemplary graphical user interface (GUI) 1213 in a mobile device, consistent with disclosed embodiments. After selecting deliveries to be groups in GUI 1211, GUI 1213 may be displayed to allow workers to select the specific wave/shift, or other delivery process for the group of selected deliveries 1212. As shown in FIG. 12G, GUI 1213 may include a selection menu 1214 in which the user can indicate which group should the selected deliveries be assigned to.

FIG. 12H is a front view of an eighth exemplary graphical user interface (GUI) 1215 in a mobile device, consistent with disclosed embodiments. GUI 1215 shows a new group creation menu 1216. Users may add new ways or shifts to the delivery process using GUI 1215.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A computerized system for delivery scheduling, comprising:
   at least one processor; and
   at least one non-transitory storage medium comprising instructions that, when executed by the at least one processor, cause the at least one processor to perform steps comprising:
   receiving, from a remote system, an electronic request to order a product;
   determining information associated with the remote system;
   determining a fulfillment center associated with the information and the product;
   assigning a delivery wave estimate by:

calculating an estimated arrival from the fulfillment center to a camp zone based on at least one of distance, historic trends, or delivery rotations; and assigning the delivery wave estimate to the first wave when determining the estimated arrival is before a first wave;

generating, based on the information associated with the remote system, an electronic message comprising:

the determined fulfillment center, the product, a time of day, and the delivery wave estimate; and forwarding, to the fulfillment center, the electronic message and instructions to generate a graphical user interface displaying the product and the delivery wave estimate, wherein determining the fulfillment center comprises:

storing in a database a plurality of previous electronic requests and associated fulfillment centers;

dividing the previous electronic requests in a training dataset and a validation dataset, the training dataset having more requests than the validation dataset;

generating a predictive model based on the training data set associating request information and fulfillment centers;

validating the predictive model using the validation dataset; and determining the fulfillment center by applying the predictive model to the electronic request.

2. The system of claim 1, wherein the information associated with the remote system comprises at least one of a username, a postal code, a physical location, or user preferences.

3. The system of claim 1, wherein the steps further comprise:

determining a region associated with the remote system information; and determining a fulfillment center from a set of fulfillment centers associated with the determined region.

4. The system of claim 1, wherein the predictive model comprises at least one of a linear regression, a random forest, or a logistic regression.

5. The system of claim 1, wherein the delivery wave estimate is generated based on a cutoff time.

6. The system of claim 5, wherein the delivery wave estimate comprises an estimate of a day and time period when the product will be delivered.

7. The system of claim 6, wherein the day and time period associated with a delivery wave estimate varies from fulfillment center to fulfillment center.

8. The system of claim 1, wherein the electronic message further comprises printing instructions for printing shipping labels listing the delivery wave estimate.

9. The system of claim 1, wherein the electronic request comprises a request to order a second product, the delivery wave estimate is a first delivery wave estimate; and the steps further comprise:

determining a fulfillment center to fulfill the second product;

generating a second delivery wave estimate for delivery of the second product;

determining that the second delivery wave estimate is different from the first delivery wave; and modifying at least one of the first or second delivery wave estimates to match the other delivery wave estimate.

10. A non-transitory computer-readable medium storing instructions that, when executed by a processor, perform operations for delivery scheduling comprising:

receiving, from a remote system, an electronic request to order a product;

determining information associated with the remote system;

determining a fulfillment center associated with the information and the product;

assigning a delivery wave estimate by:

calculating an estimated arrival from the fulfillment center to a camp zone based on at least one of distance, historic trends, or delivery rotations; and assigning the delivery wave estimate to the first wave when determining the estimated arrival is before a first wave;

generating, based on the information associated with the remote system, an electronic message comprising:

the determined fulfillment center, the product, a time of day, and the delivery wave estimate; and forwarding, to the fulfillment center, the electronic message and instructions to generate a graphical user interface displaying the product and the delivery wave estimate, wherein determining the fulfillment center comprises:

storing in a database a plurality of previous electronic requests and associated fulfillment centers;

dividing the previous electronic requests in a training dataset and a validation dataset, the training dataset having more requests than the validation dataset;

generating a predictive model based on the training data set associating request information and fulfillment centers;

validating the predictive model using the validation dataset; and determining the fulfillment center by applying the predictive model to the electronic request.

11. The medium of claim 10, wherein the information associated with the remote system comprises at least one of a username, a postal code, a physical location, or user preferences.

12. The medium of claim 10, wherein the operations further comprise:

determining a region associated with the remote system information; and determining a fulfillment center from a set of fulfillment centers associated with the determined region.

13. The medium of claim 10, wherein the predictive model comprises at least one of a linear regression, a random forest, or a logistic regression.

14. The medium of claim 10, wherein the delivery wave estimate is generated based on a cutoff time.

15. The medium of claim 14, wherein the delivery wave estimate comprises an estimate of a day and time period when the product will be delivered.

16. The medium of claim 15, wherein the day and time period associated with a delivery wave estimate varies from fulfillment center to fulfillment center.

17. The medium of claim 10, wherein the electronic message further comprises printing instructions for printing shipping labels listing the delivery wave estimate.

18. A computer-implemented method for delivery scheduling, the method comprising:
- receiving, from a remote system, an electronic request to order a first product and a second product;
- determining information associated with the remote system;
- determining a first fulfillment center associated with the information and the first product and a second fulfillment center associated with the second product and the second fulfillment center;
- assigning a first delivery wave for the first product and a second delivery wave for the second product by:
  - calculating an estimated arrival from the fulfillment center to a camp zone based on at least one of distance, historic trends, or delivery rotations; and
  - assigning the delivery wave estimate to the first wave when determining the estimated arrival is before a first wave;
- generating, based on the information associated with the remote system,
  - an electronic message comprising:
    - the first and second fulfillment centers,
    - the first and second products,
    - a time of day, and
    - the first and second delivery wave estimates;
- determining that the second delivery wave estimate is different from the first delivery wave;
- modifying at least one of the first or second delivery wave estimates to match the other delivery wave estimate;
- forwarding, to the first fulfillment center and the second fulfillment center, the electronic message and instructions to generate a graphical user interface displaying a list with the first and second products color-coded with corresponding delivery wave estimate; and
- sending an instruction to the first fulfillment center and the second fulfillment center to print shipping labels listing the first or second delivery wave estimates, wherein determining the first fulfillment center and the second fulfillment center comprises:
- storing in a database a plurality of previous electronic requests and associated fulfillment centers;
- dividing the previous electronic requests in a training dataset and a validation dataset, the training dataset having more requests than the validation dataset;
- generating a predictive model based on the training data set associating request information and fulfillment centers;
- validating the predictive model using the validation dataset; and
- determining the first fulfillment center and the second fulfillment center by applying the predictive model to the electronic request.

19. The system of claim 8, wherein:
- the electronic message is configured to be directed to networked printers; and
- the printing instructions comprise instructions encoded in Line Printer Daemon protocol or Line Printer Remote protocol.

20. The system of claim 1, wherein determining information associated with the remote system comprises:
- determining whether the electronic request is associated with a delivery promise;
- in response to determining the electronic request is associated with the delivery promise, determining whether the delivery promise requires delivery before a specific time; and
- in response to determining the delivery promise requires delivery before the specific time, generating a notification graphical user interface and specific printing instructions for expedited delivery.

\* \* \* \* \*